US012748261B2

(12) United States Patent
Parks et al.

(10) Patent No.: US 12,748,261 B2
(45) Date of Patent: Sep. 29, 2026

(54) WAVEGUIDE STRUCTURE WITH APERTURE ARRAY

(71) Applicant: Fluxus, Inc., Sunnyvale, CA (US)

(72) Inventors: Joshua Wayne Parks, Portland, OR (US); Frank Zaugg, Redwood City, CA (US)

(73) Assignee: Fluxus, Inc., Sunnyvale, CA (US)

( * ) Notice: Subject to any disclaimer, the term of this patent is extended or adjusted under 35 U.S.C. 154(b) by 732 days.

(21) Appl. No.: 17/918,039

(22) PCT Filed: Apr. 20, 2021

(86) PCT No.: PCT/US2021/028234
§ 371 (c)(1),
(2) Date: Oct. 10, 2022

(87) PCT Pub. No.: WO2021/216604
PCT Pub. Date: Oct. 28, 2021

(65) Prior Publication Data

US 2023/0131829 A1 Apr. 27, 2023

Related U.S. Application Data

(60) Provisional application No. 63/013,168, filed on Apr. 21, 2020.

(51) Int. Cl.
*G01N 21/64* (2006.01)
*G02B 6/136* (2006.01)
*G02B 6/12* (2006.01)

(52) U.S. Cl.
CPC ......... *G02B 6/136* (2013.01); *G01N 21/6454* (2013.01); *G02B 2006/121* (2013.01)

(58) Field of Classification Search
CPC . G01N 29/022; G01N 21/6454; B01L 3/5027
See application file for complete search history.

(56) References Cited

U.S. PATENT DOCUMENTS 6,063,299 A 5/2000 Drake et al.
6,253,015 B1 6/2001 Ukrainczyk
(Continued)

FOREIGN PATENT DOCUMENTS

CN 1729415 A 1/2006
JP H6-88913 A 3/1984
(Continued)

OTHER PUBLICATIONS

International Search Report and Written Opinion dated Sep. 9, 2021 directed to PCT/US2021/028234; 25 pages.
(Continued)

*Primary Examiner* — Eric Wong
(74) *Attorney, Agent, or Firm* — Morrison & Foerster LLP

(57) ABSTRACT

A waveguiding structure (500) includes one or more fluid channels (518) intersected by a waveguide (514). An aperture layer (570) of the waveguide structure includes an array of apertures adjacent to the one or more fluid channels, such that the array of apertures may allow emission signals from analytes in the fluid channels to pass through the aperture layer for detection. The aperture layer may be etched using a first etching step, while an air-gap in a substrate of the waveguiding structure may be etched using a second etching step, wherein the first etching step has a higher level of precision than the second etching step. The array of apertures may comprise one or more one-dimensional signature patterns of apertures associated with specific fluid channels of the device, such that the signature patterns may be used to demultiplex signals and to correlate a signal with one of the plurality of channels.

19 Claims, 12 Drawing Sheets

(56) References Cited

U.S. PATENT DOCUMENTS

| | | | | |
|---|---|---|---|---|
| 6,438,279 | B1 * | 8/2002 | Craighead | G02B 6/10 385/12 |
| 6,946,238 | B2 | 9/2005 | Zhang et al. | |
| 7,016,560 | B2 * | 3/2006 | Ticknor | G02B 6/3538 385/39 |
| 7,248,771 | B2 * | 7/2007 | Schmidt | G01N 21/05 385/129 |
| 9,551,650 | B2 | 1/2017 | Nitkowski et al. | |
| 9,835,801 | B1 | 12/2017 | Qian et al. | |
| 10,957,731 | B1 * | 3/2021 | Hsieh | G01N 21/6486 |
| 2003/0006140 | A1 | 1/2003 | Vacca et al. | |
| 2003/0012483 | A1 | 1/2003 | Ticknor et al. | |
| 2003/0117699 | A1 | 6/2003 | Maroney et al. | |
| 2003/0219192 | A1 | 11/2003 | Crafts et al. | |
| 2006/0098927 | A1 | 5/2006 | Schmidt | |
| 2006/0251371 | A1 | 11/2006 | Schmidt et al. | |
| 2008/0152280 | A1 | 6/2008 | Lundquist et al. | |
| 2012/0293797 | A1 | 11/2012 | Braeckmans et al. | |
| 2013/0223790 | A1 | 8/2013 | Jones et al. | |
| 2013/0244227 | A1 | 9/2013 | Schmidt et al. | |
| 2015/0093816 | A1 | 4/2015 | Lagae et al. | |
| 2015/0377780 | A1 * | 12/2015 | Walters | G01N 21/554 436/164 |
| 2016/0003730 | A1 | 1/2016 | Schreuder et al. | |
| 2016/0038940 | A1 * | 2/2016 | Babcock | B01L 3/502707 422/68.1 |
| 2016/0356708 | A1 | 12/2016 | Bennett et al. | |
| 2017/0205351 | A1 | 7/2017 | Astier et al. | |
| 2017/0227465 | A1 * | 8/2017 | Hsieh | G02B 6/0053 |
| 2018/0081207 | A1 | 3/2018 | Qian et al. | |
| 2018/0257076 | A1 * | 9/2018 | Weitz | B01L 3/502761 |
| 2019/0064421 | A1 | 2/2019 | Grot et al. | |
| 2019/0309361 | A1 | 10/2019 | Mccaffrey et al. | |
| 2020/0200972 | A1 | 6/2020 | Steglich et al. | |
| 2021/0181415 | A1 * | 6/2021 | Zaugg | G02B 6/136 |
| 2023/0131829 | A1 | 4/2023 | Parks | |
| 2023/0221491 | A1 | 7/2023 | Zaugg et al. | |
| 2024/0085629 | A1 | 3/2024 | Zaugg | |
| 2024/0118490 | A1 | 4/2024 | Zaugg | |

FOREIGN PATENT DOCUMENTS

| | | | |
|---|---|---|---|
| JP | 2004-512551 | A | 4/2004 |
| JP | 2006-47150 | A | 2/2006 |
| JP | 2014-504154 | A | 12/2014 |
| JP | 2016-224028 | A | 12/2016 |
| JP | 2017-527850 | A | 9/2017 |
| JP | 2018-72134 | A | 5/2018 |
| WO | 02/33457 | A2 | 4/2002 |
| WO | 2004/040319 | A1 | 5/2004 |
| WO | 2011/073410 | A1 | 6/2011 |
| WO | 2012/068511 | A2 | 5/2012 |
| WO | 2019/226679 | A1 | 11/2019 |

OTHER PUBLICATIONS

Invitation to Pay Additional Fees mailed Jul. 14, 2021, directed to International Application No. PCT/US2021/028234; 23 pages.

Parks et al.; "Hybrid optofluidic integration"; Lab on a Chip; vol. 13; 2013; p. 4118-4123.

Stotts et al. "Silicate Overcoat Layers for the Improvement of PECVD SiO2 Optofluidic Waveguides," IEEE 58th International Midwest Symposium on Circuits and Systems, Aug. 2-5, 2015, Fort Collins, CO, USA; 4 pages.

Chen et al. (2006). "Development of ion-implanted optical waveguides in optical materials: A review," Optical Materials 29; 1523-1542.

Extended European Search Report dated Jan. 28, 2022, directed to EP Application No. 19806437.0; 8 pages.

International Preliminary Report on Patentability mailed Dec. 3, 2020, directed to International Application No. PCT/US2019/033365; 8 pages.

International Search Report and Written Opinion dated May 23, 2023, directed to International Application No. PCT/US2022/077814; 17 pages.

International Search Report and Written Opinion mailed Aug. 9, 2019, directed to International Application No. PCT/US2019/33365; 10 pages.

Messaddeq (Spring 2015). "Glass Processing," Lehigh Lecture 19 Introduction to Dielectric Waveguide; 68 pages.

Notice of Reason for Rejection dated Feb. 7, 2023, directed to JP Application No. 2021-516527; 12 pages.

Notice of Reasons for Rejection dated Mar. 26, 2024, directed to JP Application No. 2021-516527; 9 pages.

Notice of Reasons for Rejection dated Oct. 17, 2023, directed to JP Application No. 2010-516527; 11 pages.

Notification of the First Office Action dated Jul. 15, 2022, directed to CN Application No. 201980033689.9; 16 pages.

Office Action dated Jan. 13, 2023, directed to CN Application No. 201980033689.9; 9 pages.

Office Action dated Jan. 15, 2024, directed to EP Application No. 19806437.0; 8 pages.

Office Action dated Jul. 9, 2024, directed to KR Application No. 10-2020-7036889; 15 pages.

Office Action dated May 15, 2024, directed to CA Application No. 3,098,629; 5 pages.

Office Action dated Sep. 9, 2022, directed to IN Application No. 202017051590; 6 pages.

Pena-Rodriguez et al. (2012). "Optical Waveguides Fabricated by Ion Implantation/Irradiation: A Review," Ion Implantation; 48 pages.

Righini et al. (Jul. 2014). "Glass optical waveguides: a review of fabrication techniques," Optical Engineering 53(7); 15 pages.

Song et al., (1999). "Micromachined Silicon Optical Bench for the Low Cost Optical Module," LG Corporate Institute of Technology; 9 pages.

Zaugg et al., U.S. Notice of Allowance dated Aug. 11, 2023, directed to U.S. Appl. No. 17/970,804; 9 pages.

Zaugg et al., U.S. Office Action dated Dec. 4, 2024, directed to U.S. Appl. No. 18/510,137; 9 pages.

Zaugg et al., U.S. Office Action dated Jan. 6, 2022, directed to U.S. Appl. No. 17/057,508; 14 pages.

Zaugg et al., U.S. Office Action dated Jul. 31, 2024, directed to U.S. Appl. No. 17/962,204; 9 pages.

Zhao et al., (2012). "Optimizatiion of Interface Transmission Between Integrated Solid Core and Optofluidic Waveguides," IEEE Photonics Tech. Letters 24: 1, pp. 46-48.

Office Action dated May 7, 2025, directed to JP Application No. 2022-563357; 5 pages.

Mogensen et al. (2003). "Integration of polymer waveguides for optical detection in microfabricated chemical analysis systems," Applied Optics 42(19): 4072-4079.

Office Action dated Jan. 6, 2026, directed to JP Application No. 2025-005943; 11 pages.

* cited by examiner

800

1000

WAVEGUIDE STRUCTURE WITH APERTURE ARRAY

CROSS-REFERENCE TO RELATED APPLICATIONS

This application is a U.S. national stage application under 35 U.S.C. § 371 of International Application No. PCT/US2021/028234, filed Apr. 20, 2021, which claims the benefit of U.S. Provisional Application No. 63/013,168, filed Apr. 21, 2020, the entire contents of each priority application is incorporated herein by reference.

FIELD

The present disclosure relates generally to waveguides and the fabrication thereof, and more particularly to waveguide structures such as optofluidic chips having aperture arrays disposed adjacent to fluid-core channels and/or fluid-core waveguides.

BACKGROUND

Waveguide structures such as optical chips and optofluidic chips are critical in modern biomedical research. These waveguide structures may comprise solid-core waveguides, fluidic channels, and/or fluid-core waveguides, which may be disposed in the same plane as one another and may intersect one another in various configurations.

Known techniques for collection of signals from waveguide structures include in-plane collection of signals using one or more photodetectors located in a same plane as a waveguide containing an analyte (e.g., in a same plane as a fluid-core waveguide), such as by guiding light to the one or more photodetectors using one or more in-plane waveguides. Known techniques for collection of signals from waveguide structures also include out-of-plane collection of signals using one or more photodetectors positioned above or below a plane of a waveguide containing an analyte.

SUMMARY

As described above, known techniques for collection of signals from waveguide structures include using one or more in-plane or out-of-plane waveguides. However, known techniques for collection of signals do not provide for sufficient ability to precisely control out-of-plane signal detection for complex applications such as demultiplexing of signals generated from multiple different fluid channels and/or from multiple different excitation spot-patterns. Accordingly, improved systems and methods for collection of signals from waveguide structures are needed.

Disclosed herein are improved waveguide structures, methods of fabricating said improved waveguide structures, and methods of using said improved waveguide structures. The improved waveguide structures disclosed herein may include one or more hollow-core analyte channels, such as a plurality of hollow-core analyte channels running beside one another, such that each of the one or more hollow-core analyte channels may be filled with a liquid containing respective analytes. When excited by an excitation light source, the analytes in the one or more hollow-core analyte channels may emit output light signals, such as by fluorescing, and said output light signals may be collected by one or more photodetectors. As explained herein, out-of-plane collection of said output light signals may be facilitated by use of an aperture layer of the waveguide structure, where the aperture layer comprises an array (e.g., a one-dimensional array or a two-dimensional array) of apertures disposed beneath the one or more hollow-core analyte channels to allow output/emission light to pass out of the one or more hollow-core analyte channels and through the aperture layer in a spatial pattern defined by the array of apertures.

In some embodiments, the array of apertures may be used to define one or more patterns for directing emitted light toward one or more spatially-distributed optical elements and/or photodetectors. In some embodiments, a two-dimensional array of apertures may be used to enable demultiplexing of signals collected from different hollow-core analyte channels. For example, a system may be configured such that different hollow-core analyte channels contain different kinds of analytes, and the system may be configured to automatically determine, based on a spatial, spectral, and/or temporal pattern of output signals, that the output signals are attributable to a specific one of the hollow-core analyte channels beneath which a known pattern of apertures is disposed in the aperture layer. For example, in embodiments in which analytes flow through an analyte channel and pass a plurality of apertures disposed beneath the analyte channel, the detected output light signals that pass through the plurality of apertures may form a series of intensity spikes distributed in time. In some embodiments, a system may be configured to automatically recognize and count the number of spikes detected, and to determine, by matching the number of spikes counted to a number of apertures disposed beneath the analyte channel, to which of a the plurality of analyte channels the output light signal is attributable.

In some embodiments, a waveguide structure may include more than one aperture layer. For example, an aperture layer disposed above a waveguiding layer may comprise an array of apertures configured to partially block and partially transmit excitation light incident on the waveguide structure. Thus, alternatively or in addition to using an aperture layer to form a two-dimensional pattern of emission light that is emitted from a plurality of fluid channels, an aperture layer may also be used to form a pattern of excitation light that is incident upon a plurality of fluid channels.

In some embodiments, a first waveguide structure is provided, the first structure comprising: a waveguiding layer comprising one or more fluid channels; at least one waveguide that intersects the plurality of fluid channels; a first aperture layer comprising a first array of apertures, wherein each of the one or more fluid channels is adjacent to at least one of the apertures of the first array of apertures; and a cover layer affixed to the waveguiding layer to enclose the one or more fluid channels.

In some embodiments of the first waveguide structure, the array of apertures comprises one or more respective one-dimensional aperture patterns, wherein each of the one or more one-dimensional aperture patterns is located adjacent to a respective one of the one or more fluid channels.

In some embodiments of the first waveguide structure, the plurality of respective one-dimensional aperture patterns each comprise a different number of apertures.

In some embodiments of the first waveguide structure, the plurality of respective one-dimensional aperture patterns each comprise a different spacing of apertures.

In some embodiments of the first waveguide structure, the plurality of respective one-dimensional aperture patterns each comprise different aperture sizes.

In some embodiments of the first waveguide structure, the first aperture layer comprises chrome, nickel, another metal, and/or one or more ARROW layers.

In some embodiments of the first waveguide structure, the first aperture layer is microfabricated using one or more of sputtering, e-beam evaporation, spin coating, and coating.

In some embodiments of the first waveguide structure, the at least one waveguide that intersects the one or more fluid channels comprises one or more of a solid-core waveguide, an MMI waveguide, and a tunable fluid-core MMI waveguide.

In some embodiments of the first waveguide structure, the at least one waveguide that intersects the one or more fluid channels comprises a solid-core waveguide formed in the waveguiding layer by one or more of (i) etching a plurality of air-gaps into the waveguiding layer to define the solid-core waveguide between them and (ii) doping the waveguiding layer to define the solid-core waveguide by one or more doped regions in the waveguiding layer.

In some embodiments, the first waveguide structure comprises: a substrate layer coupled to the waveguiding layer; and a substrate air-gap formed in the substrate layer at a location adjacent to one or more of the one or more fluid channels, such that light that escapes the one or more fluid channels adjacent to the air-gap through one or more of the apertures of the first array of apertures propagates into the substrate air-gap.

In some embodiments of the first waveguide structure, the substrate air gap has a diameter larger than one or more of the apertures in the first aperture layer.

In some embodiments, the first waveguide structure comprises: a second aperture layer disposed on an opposite side of the waveguiding layer from the first aperture layer, the second aperture layer comprising a second array of apertures, wherein each of the one or more fluid channels is adjacent to at least one of the apertures of the second array of apertures.

In some embodiments of the first waveguide structure, the second aperture layer is disposed on or within the cover layer.

In some embodiments of the first waveguide structure: the array of apertures is a two-dimensional array of apertures forming a plurality of one-dimensional aperture patterns; and the one or more fluid channels comprise a plurality of fluid channels, wherein each of the plurality of fluid channels is adjacent to at least one of the apertures of the two-dimensional array of apertures.

In some embodiments, a first method for fabricating a waveguide structure is provided, the first method comprising: etching an array of apertures into an aperture layer of the waveguide structure, wherein the array of apertures comprises one or more respective one-dimensional aperture patterns, wherein each of the one or more one-dimensional aperture patterns is configured to allow light to emit from a respective fluid channel of a set of one or more fluid channels of the waveguide structure.

In some embodiments, the first method comprises: etching the one or more fluid channels into a waveguiding layer of the waveguide structure; and affixing a cover layer to the waveguiding layer to enclose the one or more fluid channels.

In some embodiment, the first method comprises: etching into a substrate layer of the waveguide structure to create a substrate air-gap, such that light that escapes the one or more fluid channels through one or more of the apertures of the first aperture layer propagates into the substrate air-gap.

In some embodiments of the first method, etching into the substrate layer comprises a wet etching processing step.

In some embodiments of the first method: etching into the aperture layer comprises a first etching step having a first spatial precision; etching into the substrate layer comprises a second etching step having a second spatial precision; and the first spatial precision is more precise than the second spatial precision.

In some embodiments of the first method, etching into the aperture layer is performed before etching into the substrate layer.

In some embodiments of the first method, the substrate air gap has a diameter larger than one or more of the apertures in the first aperture layer.

In some embodiment, the first method comprises: etching a first waveguiding air-gap and a second waveguiding air gap into the waveguiding layer, wherein etching the first and the second air-gaps creates a solid-core waveguide in the waveguiding layer between the first air-gap and the second air-gap, wherein the solid-core waveguide intersects the one or more fluid channels.

In some embodiments of the first method, etching into the aperture layer comprises performing a metal etch step.

In some embodiments, a second method for fabricating a waveguide structure is provided, the second method comprising: etching one or more fluid channels into a waveguiding layer of the waveguide structure, wherein each of the one or more fluid channels is aligned with one or more apertures disposed in an aperture layer of the waveguide structure; and affixing a cover layer to the waveguiding layer to enclose the one or more fluid channels.

In some embodiments, a system for analyte detection is provided, the system comprising: a first analyte channel; a second analyte channel; an aperture layer comprising a plurality of apertures forming a first pattern of apertures aligned with the first analyte channel and a second pattern of apertures aligned with the second analyte channel; a detector configured to detect light emitted through the first pattern of apertures and light emitted through the second pattern of apertures; one or more processors configured to: receive a signal from the detector representing light emitted through one of: the first pattern of apertures and the second pattern of apertures; determine, based on the received signal, whether the signal corresponds to the first channel or to the second channel.

In some embodiments of the system, determining whether the signal corresponds to the first channel or to the second channel is performed based on determining whether a number of bursts in the signal corresponds to a number of apertures in the first pattern or to a number of apertures in the second pattern.

In some embodiments of the system, determining whether the signal corresponds to the first channel or to the second channel is performed based on determining whether a duration of a light burst represented in the signal corresponds to a diameter of an aperture in the first pattern or to a diameter of an aperture in the second pattern.

In some embodiments of the system, determining whether the signal corresponds to the first channel or to the second channel is performed based on determining whether a temporal spacing of two or more bursts represented in the signal corresponds to a physical spacing of two or more apertures in the first pattern or to a physical spacing of two or more apertures in the second pattern.

In some embodiments of the system, determining whether the signal corresponds to the first channel or to the second channel is performed based on determining whether a wavelength of one or more bursts represented in the signal corresponds to a spectral property of one or more apertures in the first pattern or to a spectral property of one or more apertures in the second pattern.

In some embodiments, a second waveguide structure is provided, the structure comprising: a waveguiding layer comprising a plurality of fluid channels; at least one waveguide that intersects the plurality of fluid channels; a first aperture layer comprising a first two-dimensional array of apertures, wherein each of the plurality of fluid channels is adjacent to at least one of the apertures of the first two-dimensional array of apertures; and a cover layer affixed to the waveguiding layer to enclose the plurality of fluid channels.

In some embodiments of the second waveguide structure, the two-dimensional array of apertures comprises a plurality of respective one-dimensional aperture patterns, wherein each of the plurality of one-dimensional aperture patterns is located adjacent to a respective one of the fluid channels.

In some embodiments of the second waveguide structure, the plurality of respective one-dimensional aperture patterns each comprise a different number of apertures.

In some embodiments of the second waveguide structure, the plurality of respective one-dimensional aperture patterns each comprise a different spacing of apertures.

In some embodiments of the second waveguide structure, the plurality of respective one-dimensional aperture patterns each comprise different aperture sizes.

In some embodiments of the second waveguide structure, the first aperture layer comprises chrome, nickel, another metal, and/or one or more ARROW layers.

In some embodiments of the second waveguide structure, the first aperture layer is microfabricated using one or more of sputtering, e-beam evaporation, spin coating, and coating.

In some embodiments of the second waveguide structure, the at least one waveguide that intersects the plurality of fluid channels comprises one or more of a solid-core waveguide, an MMI waveguide, and a tunable fluid-core MMI waveguide.

In some embodiments of the second waveguide structure, the at least one waveguide that intersects the plurality of fluid channels comprises a solid-core waveguide formed in the waveguiding layer by one or more of (i) etching a plurality of air-gaps into the waveguiding layer to define the solid-core waveguide between them and (ii) doping the waveguiding layer to define the solid-core waveguide by one or more doped regions in the waveguiding layer.

In some embodiments of the second waveguide structure, the structure comprises: a substrate layer coupled to the waveguiding layer; and a substrate air-gap formed in the substrate layer at a location adjacent to one or more of the fluid channels, such that light that escapes the one or more fluid channels through one or more of the apertures of the first two-dimensional array of apertures propagates into the substrate air-gap.

In some embodiments of the second waveguide structure, the substrate air gap has a diameter larger than one or more of the apertures in the first aperture layer.

In some embodiments of the second waveguide structure, the structure comprises: a second aperture layer disposed on an opposite side of the waveguiding layer from the first aperture layer, the second aperture layer comprising a second two-dimensional array of apertures, wherein each of the plurality of fluid channels is adjacent to at least one of the apertures of the second two-dimensional array of apertures.

In some embodiments of the second waveguide structure, the second aperture layer is disposed on or within the cover layer.

In some embodiments, a third method for fabricating a waveguide structure is provided, the first method comprising: etching a two-dimensional array of apertures into an aperture layer of the waveguide structure, wherein the two-dimensional array of apertures comprise a plurality of respective one-dimensional aperture patterns, wherein each of the plurality of one-dimensional aperture patterns is configured to allow light to emit from a respective fluid channel of the waveguide structure.

In some embodiments of the third method, the first method comprises: etching the plurality of fluid channels into a waveguiding layer of the waveguide structure; and affixing a cover layer to the waveguiding layer to enclose the plurality of fluid channels.

In some embodiments of the third method, the first method comprises: etching into a substrate layer of the waveguide structure to create a substrate air-gap, such that light that escapes the one or more fluid channels through one or more of the apertures of the first aperture layer propagates into the substrate air-gap.

In some embodiments of the third method, etching into the substrate layer comprises a wet etching processing step.

In some embodiments of the third method: etching into the aperture layer comprises a first etching step having a first spatial precision; etching into the substrate layer comprises a second etching step having a second spatial precision; and the first spatial precision is more precise than the second spatial precision.

In some embodiments of the third method, etching into the aperture layer is performed before etching into the substrate layer.

In some embodiments of the third method, the substrate air gap has a diameter larger than one or more of the apertures in the first aperture layer.

In some embodiments of the third method, the first method comprises: etching a first waveguiding air-gap and a second waveguiding air gap into the waveguiding layer, wherein etching the first and the second air-gaps creates a solid-core waveguide in the waveguiding layer between the first air-gap and the second air-gap, wherein the solid-core waveguide intersects the plurality of fluid channels.

In some embodiments of the third method, etching into the aperture layer comprises performing a metal etch step.

In some embodiments, a fourth method for fabricating a waveguide structure is provided, the second method comprising: etching a plurality of fluid channels into a waveguiding layer of the waveguide structure, wherein each of the plurality of fluid channels is aligned with one or more apertures disposed in an aperture layer of the waveguide structure; and affixing a cover layer to the waveguiding layer to enclose the plurality of fluid channels.

In some embodiments, any one or more of the features or aspects of any one or more of the embodiments set forth above may be combined with one another, and/or with other features or aspects of any method, system, technique, or device disclosed herein.

DETAILED DESCRIPTION

Figure 1A:
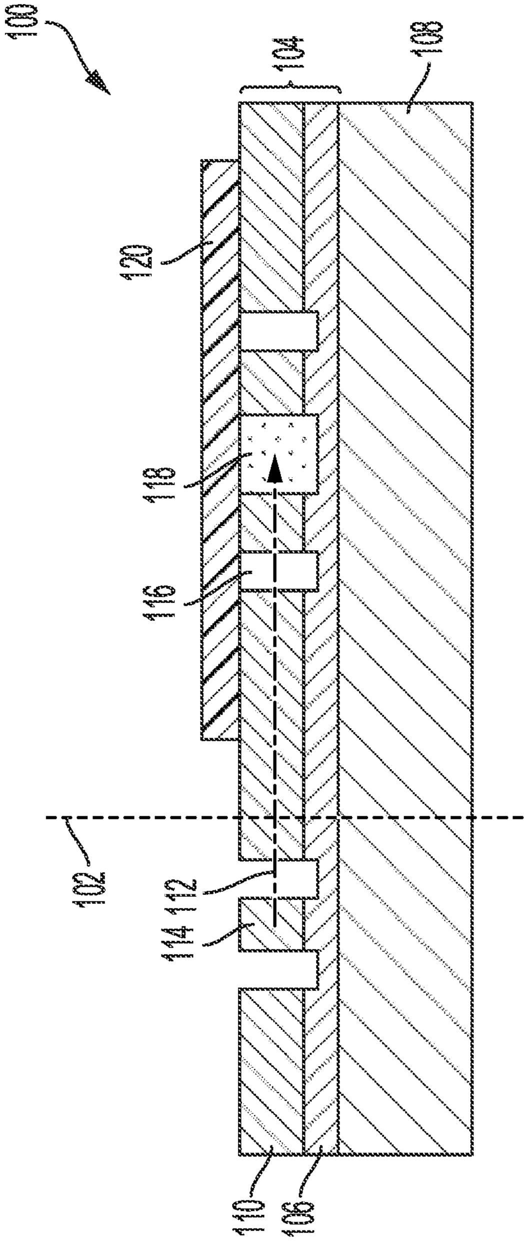
FIGS. 1A and 1B depict two schematic views of a waveguide structure, in accordance with some embodiments.

Disclosed herein are waveguide structures and techniques for fabrication thereof. In some embodiments, as described herein, a waveguide structure may comprise one or more fluid channels (for example, a plurality of fluid channels running alongside one another) in a waveguiding layer of the structure. One or more aperture layers may be disposed above and/or below the waveguiding layer and may be configured to partially block and/or partially transmit light through a plurality of apertures disposed in each of the respective aperture layers, wherein the plurality of apertures are disposed in an array so as to be located adjacent to a one or more of the plurality of fluid channels. The aperture array(s) may partially block and partially transmit light into and/or out of the fluid channels, thereby forming predefined zones within the fluid channels where excitation light may be incident and/or from which emission light may escape. By forming predefined excitation/emission zones, signals emitted from the various channels may be controlled by the aperture layer(s) and may be used for improvement of signal-to-noise ratio and/or for spatial/temporal demultiplexing of various signals received from different fluid channels.

While this disclosure sets forth and describes, by way of example, several embodiments in which a plurality of fluid channels (e.g., two or more fluid channels flowing in parallel to one another) are used with one or more two-dimensional arrays of apertures, a person of ordinary skill in the art will understand, in light of the disclosure herein, that one or more of the systems, methods, and/or techniques described herein may be applicable in a same or similar manner in embodiments in which a single fluid channel and one or more one-dimensional arrays of apertures are provided. In some embodiments, a one-dimensional array of apertures may comprise a pattern of apertures adjacent to a single fluid channel in a waveguide structure, and the one-dimensional array of apertures may improve precision of excitation and/or signal collection, for example by improving signal-to-noise ratio. In some embodiments, a one-dimensional array of apertures may be used in a similar manner to the manner described herein in which two-dimensional aperture arrays may be used, for example to collect light emitted through the aperture array and to analyze said collected signals to perform one or more analyte detection, flow-rate determination, channel/analyte/device identification, and/or demultiplexing. In some embodiments, a one-dimensional array of apertures may be used to determine an identity of an aperture pattern, associated channel, associated device, and/or associated analyte in a same or similar manner as described herein with respect to determination of which of multiple analyte channels are associated with respective patterns in a two-dimensional aperture array.

In some embodiments, as described herein, one or more of the waveguide structures disclosed herein may be formed by performing a single lithography/etching process followed by a bonding process. This fabrication approach may replace the unwieldy and expansive series of steps required by previous fabrication techniques. For example, a waveguide structure (e.g., a two-dimensional waveguide structure) may be formed from a chip comprising a substrate layer and a waveguiding layer on top of the substrate layer. In some embodiments, the substrate layer may be formed of silicon or other suitable materials and the waveguiding layer may be formed of one or more oxides, such as low temperature oxide, phosphorous doped oxide, silicon oxynitride, or other suitable materials. The waveguiding layer may in some embodiments be greater than or equal to 1 μm, 5 μm, 10 μm, or 20 μm thick. The waveguiding layer may in some embodiments be less than or equal to 1 μm, 5 μm, 10 μm, or 20 μm thick. The material(s) used in the waveguiding layer may be selected such that the material effectively transmits light and may form both the solid core of a solid-core waveguide and the walls of a fluid channel and/or the walls of a fluid-core waveguide.

After the waveguiding layer is disposed (e.g. placed or deposited) on the substrate layer, one or more etching steps may be performed in order to form one or more of a solid-core waveguide and one or more a fluid channels (which may in some embodiments also be fluid-core waveguides). To form a fluid channel, the hollow core of the channel may be etched out of the waveguiding layer.

In some embodiments, the dimensions of the fluid channel may be varied to affect the flow speed of a fluid through the fluid channel. In some embodiments, flow of fluid through the fluid channel may be cause by one or more of vacuum, positive pressure, electroosmosis, and/or electrophoresis. In some embodiments, geometries of the fluid channel may be formed to cause flow focusing via sheath flow. In some embodiments, a height and or width of a channel fluid channel may be less than or equal to 0.25 μm, 0.5 μm, 1 μm, 5 μm, 10 μm, 25 μm, 50 μm, 100 μm, 250 μm, 500 μm, or 1000 μm. In some embodiments, a height and or width of a channel fluid channel may be greater than or equal to 0.25 μm, 0.5 μm, 1 μm, 5 μm, 10 μm, 25 μm, 50 μm, 100 μm, 250 μm, 500 μm, or 1000 μm. In some embodiments, a flow speed through a fluid channel may be less than or equal to 0.005 μL/min, 0.01 μL/min, 0.1 μL/min, 1 μL/min, 10 μL/min, 100 μL/min, or 500 μL/min. In some embodiments, a flow speed through a fluid channel may be greater than or equal to 0.005 μL/min, 0.01 μL/min, 0.1 μL/min, 1 μL/min, 10 μL/min, 100 μL/min, or 500 μL/min.

To form a solid core waveguide, air-gaps may be etched out of the waveguiding layer on each side of the solid-core waveguide, such that the solid-core waveguide is formed from the remaining material of the waveguiding layer left between the air gaps. In some embodiments, the etching steps may comprise dry etching such as reactive-ion etching, deep reactive ion etching, and/or neutral loop discharge etching; in some embodiments, the etching steps may comprise wet etching such as etching with buffered hydrofluoric acid. In some embodiments, in addition to etching air gaps to define areas to each side of the solid-core waveguide, the etching process may also comprise etching an area at an end of the solid-core waveguide, thereby forming an end of the optical waveguide (e.g., an optical facet) into which light may be coupled.

After etching the waveguiding layer to form the solid core waveguide(s) and the fluid channel(s), a cover layer may be applied to the top of the waveguiding layer to enclose the open top side of the fluid channel and/or to enclose one or more of the air-gaps. In some embodiments, the cover layer may comprise bonded glass, ARROW layers, or total-internal-reflection-coated (e.g., low refractive index materials such as TEFLON AF) or metal-coated materials. In some embodiments, the cover layer may be less than or equal to 1 μm, 5 μm, 10 μm, 50 μm, 100 μm, 150 μm, or 200 μm, 300 μm, or 500 μm thick. In some embodiments, the cover layer may be greater than or equal to 1 μm, 5 μm, or 10 μm, 50 μm, 100 μm, 150 μm, or 200 μm, 300 μm, or 500 μm. In some embodiments, the cover layer may be affixed to the waveguiding layer (or to another layer of the waveguide structure, as discussed further below), by permanent or impermanent bonding, adhesive gluing, or other suitable means.

After the etching and attachment of the cover layer is complete, the fluid channel may be filled with fluid (e.g., gas and/or liquid), such as a gas or liquid containing analytes to be excited by excitation light that propagates along the solid-core waveguide and is incident upon the fluid channel. In some embodiments, emission from analytes in the fluid channel may be collected out-of-plane (e.g., by overhead or underneath photodetectors) or in-plane (e.g., by being guided to an in-plane photodetector by the fluid channel when the fluid channel is a fluid-core waveguide or by capture of said emission by a solid-core waveguide structure without the use of a fluid-core waveguide).

In some embodiments, performance of the fluid channel as a fluid-core waveguide (e.g., for in-plane detection of emission light) may be increased by reducing wall thicknesses, by reducing cladding material average refractive index or by etching out some of the substrate layer beneath the channel, as discussed further below.

Figure 1B:
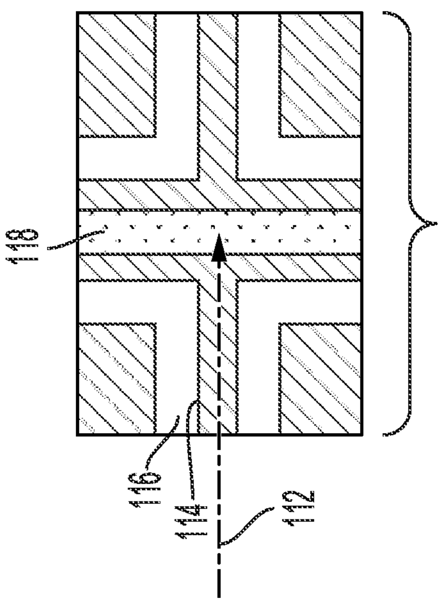

FIGS. 1A and 1B depict two schematic views of a waveguide structure 100, in accordance with some embodiments. FIG. 1A shows a cross-sectional view from two angles of the waveguide structure 100, with the two views demarcated by the dotted line indicating a 90° corner 102. FIG. 1B shows an overhead view of the waveguide structure 100.

As shown in FIG. 1A, the waveguiding layer 104 may be formed of one or more oxide layers. In some embodiments, a low-index oxide layer 106 may be disposed atop a substrate (e.g., silicon) layer 108, and a high-index oxide layer 110 may be disposed atop the low-index oxide layer 106. The two oxide layers may together form the waveguiding layer 104. As light 112 propagates through the high-index oxide layer 110, it may be internally reflected along the solid-core waveguide 114 by the air-gaps 116 and/or the low-index oxide layer 106. In some embodiments, the low-index oxide layer 106 and the substrate layer 108 may both be replaced by a low-index substrate layer.

As shown in FIG. 1A, the etching steps forming the air gaps 116 and fluid channel 118 may be performed such that the high-index oxide layer 110 and the low-index oxide layer 106 are etched into and/or through simultaneously. That is, rather than etching the oxide layers separately and then aligning the gaps/channels etched into them, the etching may be performed after the layers are already bonded to one another, thereby achieving automatic alignment. As shown in the example of FIG. 1, the channel 118 and/or air gaps 116 may in some embodiments be formed by etching entirely through the high-index oxide layer 110 from above and partially into the low-index oxide layer 106 from above. In some embodiments, waveguide structure 100 may comprise cover layer 120, which may be applied to the top of the waveguiding layer 104 to enclose the open top side of the fluid channel 118 and/or enclose one or more the air-gaps 116.

In some embodiments of any of the waveguide structures disclosed herein, one or more of the waveguide layers may be placed or deposited atop another one of the layers. In some embodiments, one or more layers may be deposited via sputter, spin-on, plasma-enhanced chemical vapor deposition (PECVD), low pressure chemical vapor deposition (LPCVD), e-beam evaporation, and/or any other deposition method.

As there is only one lithographic step, it may be very easy using this method to create more complicated waveguide structures and expose individual dies for this process (e.g. e-beam defined features). Furthermore, there is no need for aligning masks between fabrication steps in this workflow.

In some embodiments of waveguide structure 100 and/or of other waveguide structures discussed herein, an index of refraction of a high-index oxide (e.g., layer 110) may be less than or equal to 1, 2, 3, or 4. In some embodiments of FIG. 1 and/or of other waveguide structures discussed herein, an index of refraction of a high-index oxide (e.g., layer 110) may be greater than or equal to 1, 2, 3, or 4.

In some embodiments of waveguide structure 100 and/or of other waveguide structures discussed herein, an index of refraction of a low-index oxide (e.g., layer 106) may be less than or equal to 1, 2, 3, or 4. In some embodiments of FIG. 1 and/or of other waveguide structures discussed herein, an index of refraction of a low-index oxide (e.g., layer 106) may be greater than or equal to 1, 2, 3, or 4.

In some embodiments of waveguide structure 100 and/or of other waveguide structures, an index of refraction of a doped oxide may be less than or equal to 1, 2, 3, or 4. In some embodiments of FIG. 1 and/or of other waveguide structures discussed herein, an index of refraction of a doped oxide may be greater than or equal to 1, 2, 3, or 4.

In some embodiments, a thickness of an oxide layer adjacent to a substrate layer (e.g., low-index oxide layer 106) may be less than or equal to 0.05 μm, 0.1 μm, 0.5 μm, 1 μm, 5 μm, 10 μm, or 50 μm. In some embodiments, a thickness of an oxide layer adjacent to a substrate layer (e.g., low-index oxide layer 106) may be greater than or equal to 0.05 μm, 0.1 μm, 0.5 μm, 1 μm, 5 μm, 10 μm, or 50 μm. In some embodiments, an oxide layer adjacent to a substrate layer (e.g., low-index oxide layer 106) thicker may improve guiding properties of the waveguides and/or to reduce the background photoluminescence from adjacent silicon/substrate material.

In some embodiments, a thickness of a core oxide layer (e.g., high-index oxide layer 110) may be less than or equal to 0.5 μm, 1 μm, 2.5 μm, 5 μm, 7.5 μm, 10 μm, or 15 μm. In some embodiments, a thickness of a core oxide layer (e.g., high-index oxide layer 110) may be greater than or equal to 0.5 μm, 1 μm, 2.5 μm, 5 μm, 7.5 μm, 10 μm, or 15 μm.

Additionally or alternatively, in some embodiments, a transparent or translucent material may be used for a substrate such as substrate layer 108. In some embodiments, using a transparent or translucent substrate may serve as an alternative to etching into a substrate layer, as it may be possible to detect optofluidic signals through a transparent or translucent substrate material without the need to machine a wafer substrate. This may, in some embodiment, afford an advantage of increased stability and reduced cost.

Figure 2A:
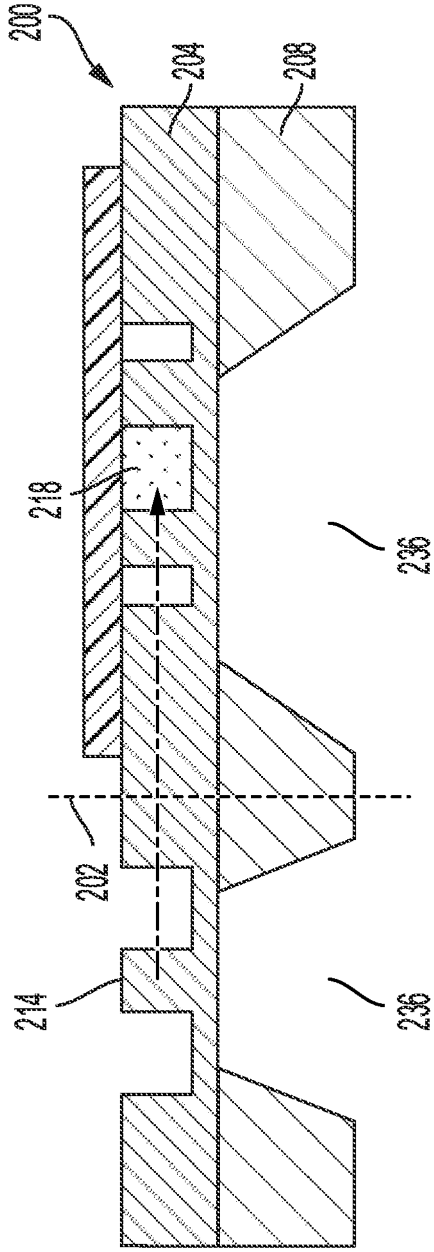
FIGS. 2A and 2B depict two schematic views of a waveguide structure comprising air-gaps formed in a substrate layer, in accordance with some embodiments.
Figure 2B:
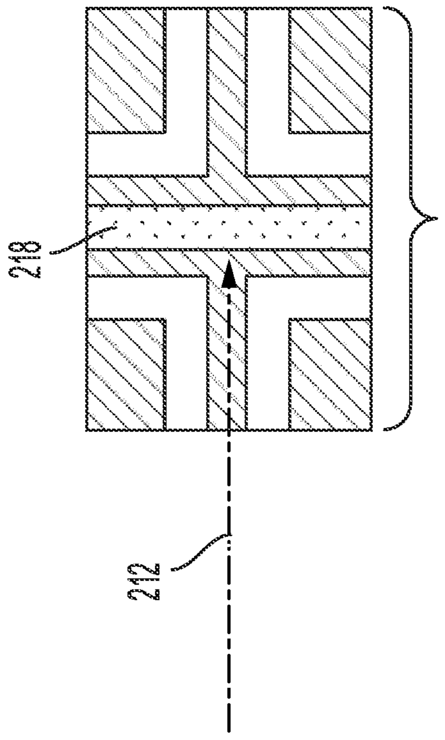

FIGS. 2A and 2B depict two schematic views of a waveguide structure 200 comprising air-gaps 236 formed in a substrate layer 208, in accordance with some embodiments. FIG. 2A shows a cross-sectional view from two angles of the waveguide structure 200, with the two views demarcated by the dotted line indicating a 90° corner 202. FIG. 2B shows an overhead view of the waveguide structure 200.

The waveguide structure 200 shown in FIG. 2 may share any one or more characteristics in common with the waveguide structure 100 shown in FIG. 1, and may differ from the structure 100 shown in FIG. 1 in that, in addition to the top-down etching performed to create the fluid channel 218 and solid-core waveguide 214 in the waveguiding layer 204, bottom-up etching may also be performed in order to remove part of the substrate layer 208 and to expose the underside of the waveguiding layer 204 to one or more air-gaps 236 beneath the fluid channel 218 and/or the solid-core waveguide 214. By creating the one or more air-gaps 236 beneath the fluid channel 218 and/or the solid-core waveguide 214, the need for ARROW layers or for low-index oxide layers may be eliminated, as the air-gap 236 carved out of the substrate layer 208 may itself prevent light 212 in the solid-core waveguide 214 and/or the fluid channel 218 (which may serve as a fluid-core waveguide) from leaking downward and out of the waveguide 214/channel 218.

In some embodiments, etching into the substrate layer 208, such as by etching into the side of the substrate layer 208 opposite the waveguiding layers 204 as shown in FIG. 2, may be used additionally or alternatively to form one or more fluidic channels and/or other structures for fluidic routing through the substrate layer 208.

In some embodiments, etching into the substrate layer 208, such as by etching into the side of the substrate layer 208 opposite the waveguiding layers 204 as shown in FIG. 2, may be used additionally or alternatively to form structures on the waveguide structure 200 for use in physically positioning the waveguide structure 200. In some embodiments, microfabrication of the substrate 208 may be used to form one or more kinematic structures. In some embodiments, one or more structures formed via etching into the substrate layer 208 may be used to attach and/or physically interact with a physical positioning and/or alignment system. In some embodiments, one or more structures formed via etching into the substrate layer 208 may be filled with, may receive, and/or may otherwise attach to magnetic material and/or one or more magnetic components for use in kinematic applications.

Figure 3A:
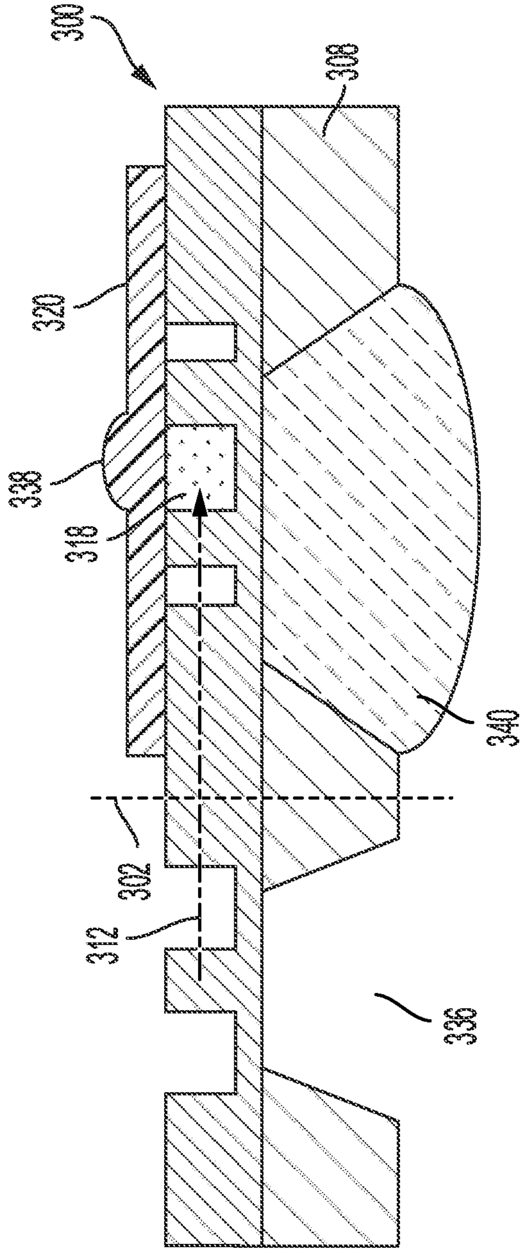
FIGS. 3A and 3B depict two schematic views of a waveguide structure comprising air-gaps formed in a substrate layer and comprising lenses for light collection, in accordance with some embodiments.
Figure 3B:
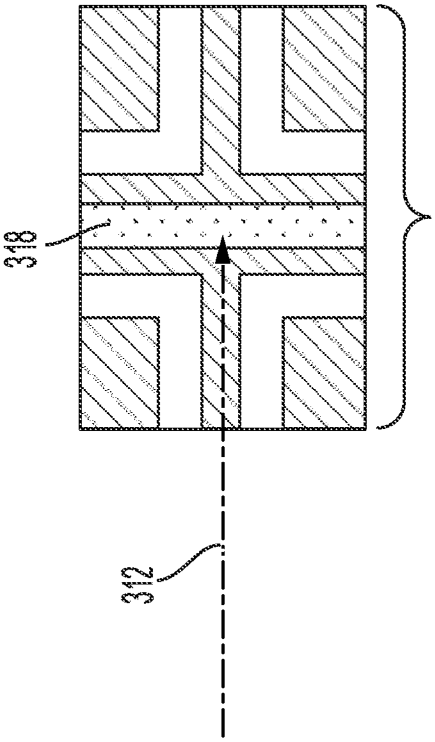

FIGS. 3A and 3B depict two schematic views of a waveguide structure 300 comprising air-gaps 336 formed in a substrate layer 308 and comprising lenses 338 for light collection, in accordance with some embodiments. FIG. 3A shows a cross-sectional view from two angles of the waveguide structure 300, with the two views demarcated by the dotted line indicating a 90° corner 302. FIG. 3B shows an overhead view of the waveguide structure 300.

The waveguide structure 300 shown in FIG. 3 may share any one or more characteristics in common with the waveguide structure 200 shown in FIG. 2, and may differ from the structure 200 shown in FIG. 2 in that the structure 300 may further include one or more lenses, for example for use in out-of-plane excitation light collection. As shown, one or more lenses such as lens 338 may be included in or affixed to the cover layer 320, such as by adhesive gluing, permanent or impermanent bonding, or by fabrication within the cover layer 320 itself, for overhead collection of excitation light 312 from the fluid channel 318. Alternately or additionally, one or more lenses such as lens 340 may be attached underneath the fluid channel 318 following etching the underside air-gap 336 out of the substrate 308, for underside collection of excitation light 312 from the fluid channel 318. In some embodiments, the one or more lenses 338, 340 may be formed from a polymeric material, dielectric material, glass, or any other suitable material.

Figure 4A:
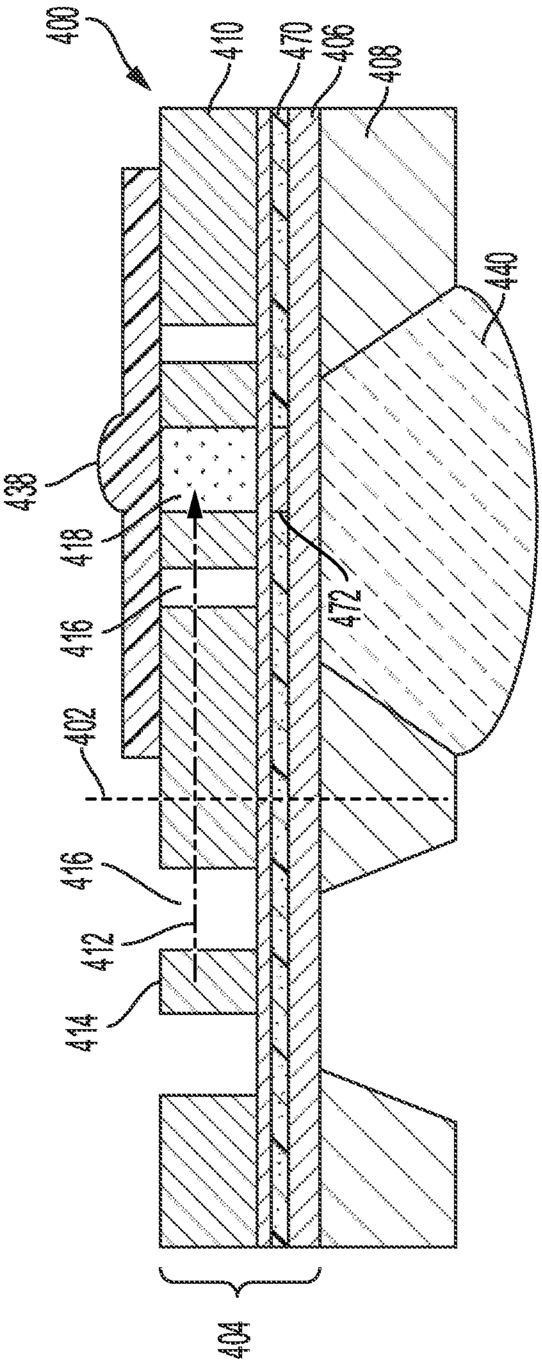
FIGS. 4A and 4B depict two schematic views of a waveguide structure comprising air-gaps formed in a substrate layer and comprising lenses for light collection and comprising an aperture layer, in accordance with some embodiments.
Figure 4B:
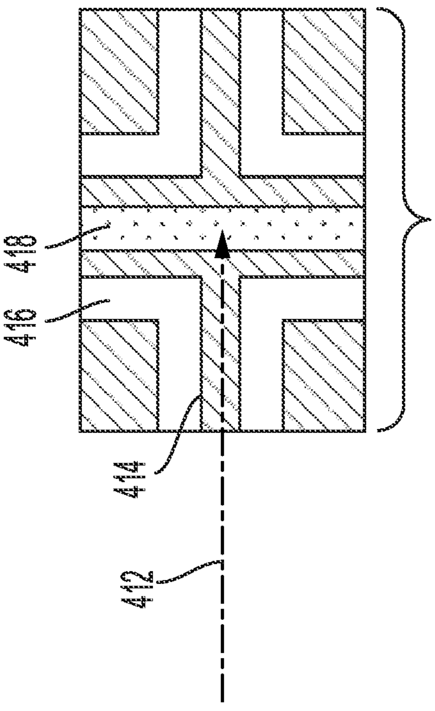

FIG. 4 depicts two schematic views of a waveguide structure 400 comprising air-gaps 416 formed in a substrate layer 408 and comprising lenses 438 and 440 for light collection and comprising an aperture layer 470, in accordance with some embodiments. FIG. 4A shows a cross-sectional view from two angles of the waveguide structure 400, with the two views demarcated by the dotted line indicating a 90° corner 402. FIG. 4B shows an overhead view of the waveguide structure.

The waveguide structure 400 shown in FIG. 4 may share any one or more characteristics in common with the waveguide structure 300 shown in FIG. 3, and may differ from the waveguide structure 300 discussed above with respect to FIG. 3 in that the structure 400 may further include an aperture layer 470 configured to allow light from signal to pass through to the aperture 472 for collection while blocking other light. In some embodiments, one or more apertures formed in the aperture layer 470 may be positioned near the fluid channel 418 and near the lenses 440 embedded into the substrate layer 408 to allow signal light to pass from the fluid channel 418 through the aperture layer 470 and into the lens 440 in the substrate 408 for collection, while blocking background light that does not pass through the aperture 472 and is instead blocked by opaque portions of the aperture layer 470.

In some embodiments, the aperture layer 470 may comprise one or more adjacent apertures, different shaped apertures, multiple apertures forming one or more patterns, and/or spectrally-dependent apertures (e.g., an aperture layer 470 may in some embodiments comprise a stack of ARROW layers). In some embodiments, one or more apertures in the aperture layer 470 may be used to spatially filter excitation light, such that, for example, a beam of excitation light incident on the waveguide structure 400 may only be able to make it through one or more apertures in the aperture layer 470.

As shown in FIG. 4, the aperture layer 470 may be positioned above the substrate layer 408 (e.g., the silicon layer) and the lenses 440 embedded into the substrate layer 408, and may be positioned below and adjacent to the fluid channel 418. In some embodiments, as shown in the example of FIG. 4, the aperture layer 470 may be embedded in a portion of the waveguiding layer 404 such as by being sandwiched between two different low-index oxide layers. In some embodiments, a three-layer sandwich comprising two low-index oxide layers surrounding the aperture layer 470 may itself be sandwiched between a substrate layer and a high-index oxide layer, as shown in FIG. 4.

An additional difference between FIG. 4 and FIG. 3 is that the waveguiding layer 404 of FIG. 4 comprises both low-index oxide layers (e.g., layer 406) and a high-index oxide layer (e.g., layer 410). In some embodiments, positioning the aperture layer 470 between two low-index oxide layers (and/or suspending the aperture layer in the center of a single low-index oxide layer 406) may optically isolate the aperture layer 470 from the waveguides in the waveguiding layer 404, thereby preventing the aperture layer 470 from absorbing light out of the waveguides. Furthermore, positioning the aperture layer 470 between two low-index oxide layers (and/or suspending the aperture layer in the center of a single low-index oxide layer 406) may physically isolate the aperture layer 470 from the substrate layer 408 and/or from upper portions of the waveguiding layer (e.g., layer 410), thereby allowing etching and other post-processing steps to be performed on the substrate layer 408 and/or the upper portions of the waveguiding layer (e.g., layer 410) without disrupting or compromising the aperture layer 470.

In some embodiments, the aperture layer 470 may comprise chrome, nickel, another metal, one or more ARROW layers (e.g., a patterned ARROW layer), and/or another opaque material configured to block background light. In some embodiments, the aperture layer 470 may be microfabricated, such that microfabrication (e.g., including sputtering, e-beam evaporation, spin coating, and/or one or more coating techniques) may be used to form one or more features of an aperture itself. In some embodiments, the substrate layer 408 (e.g., a silicon substrate layer) may be coated with a thick layer (e.g., about equal to or greater than or equal to 2 μm) of an optically transparent material forming the lowermost low-index oxide layer 406 (which may in some embodiments have the same or similar dimensions as other lowermost low-index oxide layers discussed herein). Microfabrication may then be used to create one or more features (e.g., one or more holes) in a thin (e.g., about equal to or less than 0.1 μm) layer of patterned absorbing material to form the aperture layer 470 (which may in some embodiments have the same or similar dimensions as other aperture layers discussed herein). Next, a thick layer (e.g., about equal to or greater than 1 μm, 5 μm, or 10 μm) of an optically transparent low-index material may be deposited atop the aperture layer to form another low-index oxide layer isolating the aperture layer (wherein the low-index oxide layer isolating the aperture layer may in some embodiments have the same or similar dimensions as other lowermost or substrate-adjacent low-index oxide layers discussed herein). A higher index material may then be deposited atop the low-index oxide layer to form a high-index region of the waveguiding layer (wherein the high-index region may have a same or similar thickness as other high-index oxide layers discussed herein). A single lithography process—that may be aligned to the features of the absorbing layer (e.g., aligned to form a fluid channel above the aperture in the aperture layer 470)—may then be used to simultaneously define the fluid-core and solid core waveguides 418 and 414 in the waveguiding layer 404.

In some embodiments, the substrate 408 of the waveguide structure 400 of FIG. 4 may comprise a low-index material such as a low-index oxide. In some embodiments, an aperture layer 470 sharing one or more characteristics in common with those described with respect to FIG. 4, may be incorporated into any one or more of the other non-axial-detection waveguide structures described herein.

Figure 5A:
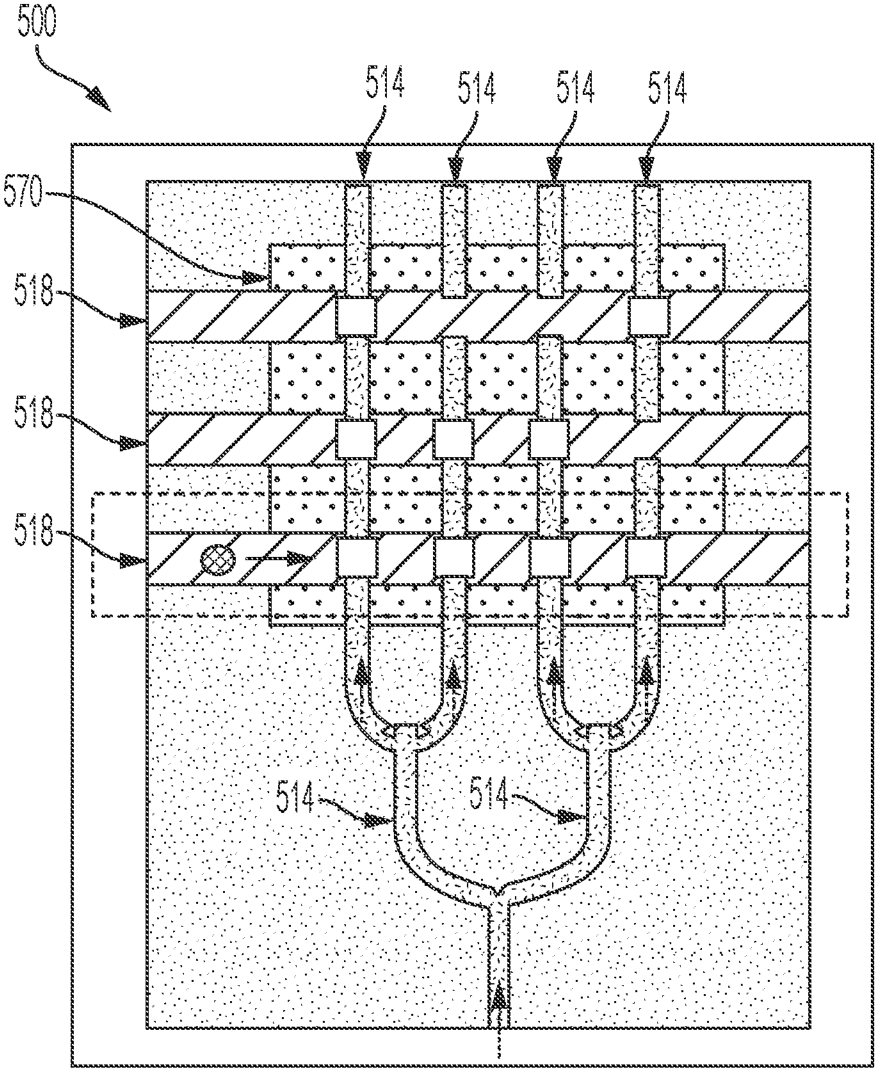
FIGS. 5A and 5B depict two schematic views of a waveguide structure comprising a plurality of fluid channels disposed alongside one another and comprising an aperture layer comprising a two-dimensional aperture array.
Figure 5B:
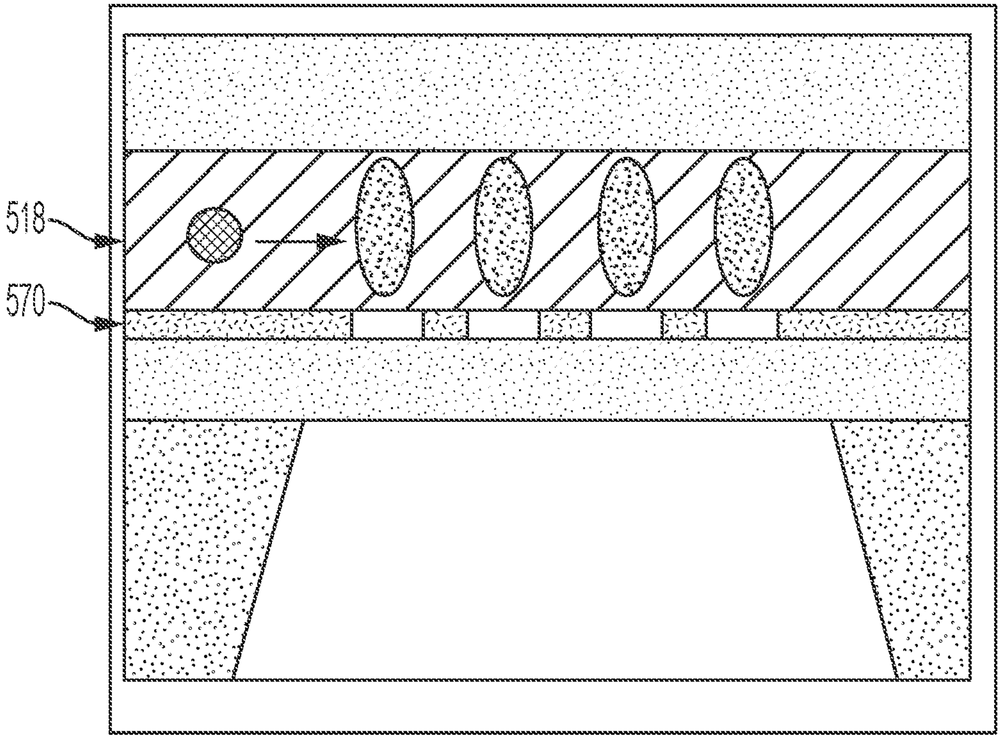
Figure 5C:
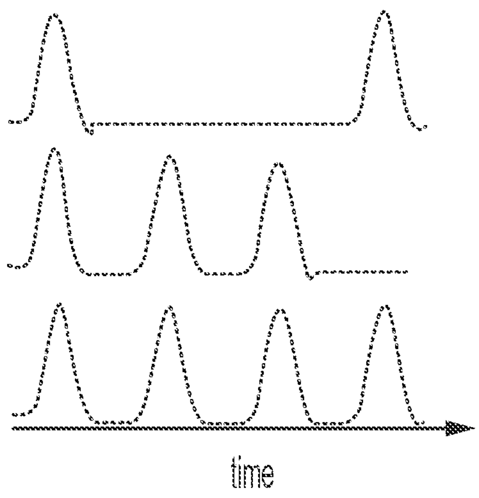
FIG. 5C depicts an example of three time-varying light intensity signals attributable to light emitted from the three fluid channels shown in FIG. 5A.

FIG. 5 depicts two schematic views of a waveguide structure 500 comprising three analyte channels and an aperture layer, in accordance with some embodiments. FIG. 5A shows an overhead view of the waveguide structure 500. FIG. 5B shows a partial cross-sectional view of the waveguide structure. FIG. 5C shows time-varying intensity signals from light emitted from the three analyte channels of waveguide structure 500.

The waveguide structure 500 shown in FIG. 5 may share any one or more characteristics in common with the waveguide structure 400 shown in FIG. 4, and may differ from the waveguide structure 400 discussed above with respect to FIG. 3 in that the structure 500 may include not one fluid channel but a plurality of fluid channels (e.g., analyte channels) running alongside one another, as discussed further below. Waveguide structure 500 may further differ from waveguide structure 400 in that waveguide structure 500 may comprise one or more two-dimensional arrays of apertures formed in one or more of the aperture layers of waveguide structure 500, as discussed further below. Waveguide structure 500 may further differ from waveguide structure 400 in that waveguide structure 500 may comprise a second aperture layer disposed above the fluid channel(s) (e.g., disposed opposite the fluid channel(s) from a substrate), alternatively or additionally to a substrate layer disposed below the fluid channel(s) (e.g., disposed on a same side of the fluid channels as a substrate layer, as shown by aperture layer 470 in FIG. 4), as discussed further below.

In some embodiments, waveguide structure 500 may comprise a plurality of fluid channels 518 running alongside (e.g., parallel to) one another. Fluid channels 518 may be formed in waveguiding layer 514 and may share any one or more characteristics in common with fluid channel 418 in structure 400, and may be formed in accordance with any one or more of the same techniques, such as by etching into waveguiding layer 514. In some embodiments, the plurality of fluid channels running alongside one another in waveguide structure 500 may allow for increased throughput/parallelization and/or may allow for different protocols/procedures to be simultaneously carried out, such as by different fluid channels with different fluids and/or different analytes.

In some embodiments, as shown in FIG. 5A, one or more of the fluid channels 518 may be configured to intersect with and be illuminated by one or more waveguides 514. In some embodiments, waveguide(s) 514 may share any one or more characteristics in common with waveguide 414 in structure 400, and may be formed in accordance with any one or more of the same techniques, such as by etching air gaps into waveguiding layer 504. In some embodiments, waveguide (s) 514 may comprise solid-core waveguides, a plurality of waveguides connected by one or more y-splitters, one or more MMI waveguides, one or more hollow-core waveguides, and/or one or more tunable fluid-core MMI waveguides. In some embodiments, any one or more of the waveguide(s) 514 may intersect with one or more of the fluid channels 518, including by continuing through and past one of more of the fluid channels 518 to thereafter be incident upon another one of the fluid channels 518. In the example show in FIG. 5A, waveguide(s) 514 comprise a plurality of solid-core waveguides connected via y-splitters to direct a pattern of four spots of excitation light onto each of the three fluid channels 518. In some embodiments, similar spot-patters of illumination light may be produced by one or more MMI waveguides and/or by use of one or more aperture layers as discussed in further detail below.

In some embodiments, waveguide structure 500 may comprise one or more aperture layers, such as aperture layer 570 shown in FIGS. 5A and 5B. As explained herein, one or more aperture layers included in structure 500 may include a plurality of apertures arranged in a two-dimensional array or other two-dimensional pattern such that the apertures allows some but not all light to pass through the aperture layer in a spatial pattern defined by distribution of the apertures. An aperture layer may be used to control transmission of excitation light incident on one or more fluid channels; an aperture layer may additionally or alternatively be used to control transmission of emission/output light that propagates outward from one or more fluid channels.

In some embodiments, aperture layer 570 may be disposed below fluid channels 518 (e.g., between fluid channels 518 and a substrate layer of structure 500) and may be configured to partially block emission/output light from exiting one or more of fluid channels 518 and propagating downward towards the substrate layer. In some embodiments, aperture layer 570 may share any one or more characteristics in common with aperture layer 470 described above with reference to FIG. 4. Respective apertures in aperture layer 570 may be disposed beneath a respective one of fluid channels 518 to allow emission/output light to exit from the respective fluid channel in a predefined space, therefore defining a "zone" (e.g., an excitation zone and/or a emission zone) in the fluid channel adjacent to the aperture in which signal from the channel may be collected by a sensor disposed on an opposite side of the aperture layer from the channel. In this way, signal from analytes in the channel may only be detected when the analyte is located in a zone adjacent to an aperture, even if the analyte emits emission/output light when it is located in other locations.

In some embodiments, additionally or alternatively to aperture layer 570, waveguide structure 500 may comprise a second aperture layer (not shown in FIG. 5A or 5B) disposed above fluid channels 518 (e.g., on an opposite side of fluid channels 518 from a substrate layer of structure 500). In some embodiments, the second aperture layer may be configured to partially block excitation/input light from entering one or more of fluid channels 518. In some embodiments, the second aperture layer may share any one or more characteristics in common with aperture layer 470 described above with reference to FIG. 4 and/or with aperture layer 570 described immediately above, except that the second aperture layer may be disposed on an out-of-plane excitation side of the fluid channels, rather than on an out-of-plane emission side of the fluid channels. In some embodiments, the second aperture layer may be configured to partially block output light from exiting one or more of fluid channels 518. In some embodiments, use of two aperture layers disposed on different sides of one or more fluid channels may enable spatial and/or spectral filtering of input light and/or output light from one or both sides of the one or more fluid channels. For example while aperture layer 570 may be disposed in or on an oxide layer beneath the waveguiding layer and above a substrate layer, the second aperture layer may instead be disposed in or on an oxide layer disposed above the waveguiding layer.

Additionally or alternatively, the second aperture layer may be disposed in or on a cover layer that is disposed atop the waveguiding layer (or atop one or more layers that are themselves disposed atop the waveguiding layer), such as a cover layer sharing any one or more characteristics in common with cover layer 120 as described above with respect to FIG. 1. In some embodiments, one or more apertures can be defined in a cover layer of various compositions. For example, a base cover layer may be formed using a transparent/translucent material such as a flexible material (e.g., plastic foil) or a rigid material (e.g., glass wafer). A non-transparent material may then be uniformly coated onto the transparent/translucent base layer of the cover (for example via spin coating, spraying, evaporation, vapor deposition, etc.). Then, one or more methods such as embossing, laser ablation, lithography, or the like may be used to form one or more a holes in the non-transparent layer, forming an optically functional aperture layer in the substrate that allows light to pass through the holes while nonetheless retaining fluid inside the one or more fluid channels bounded by the cover layer.

In some embodiments, one or more of various bonding techniques may be used to form a seal between an aperture-patterned cover layer and a component of the waveguide structure to which it is bonded. In some embodiments different bonding techniques may be used based on the composition/shape of the base layer and/or optically opaque aperture layer. Bonding methods may include thermal, fusion, frit, eutectic, etc. One advantage of integrating apertures into a cover layer is that the fabrication of said apertures may then be performed separately from one or more other components of the waveguide structure (e.g., before affixing the cover layer thereto), thereby mitigating various tolerance stack-ups, enabling more flexibility in fabrication workflows, and/or allowing for incorporation of various (e.g., non-CMOS) materials.

Respective apertures in the second aperture layer may be disposed above a respective one of fluid channels 518 to allow excitation/input light to enter into the respective fluid channel in a predefined space, therefore defining a "zone" (e.g., an excitation zone and/or a emission zone) in the fluid channel adjacent to the aperture in which excitation light from an out-of-plane excitation light source disposed on an opposite side of the aperture layer from the channel may enter into the channel. In this way, excitation light may enter the channel and be incident upon an analyte only when the analyte is located in a zone adjacent to an aperture, even if the excitation light is broadly incident (e.g., by flood excitation) on the analyte emits emission/output light when it is located in other locations. In some embodiments in which the second aperture layer is disposed in or on a cover layer of structure 500, one or more optical features (e.g., lenses, such as lens 438 described above with respect to FIG. 4) may be disposed in the cover layer such that they align with the one or more apertures and facilitate transmission of light through the aperture and into a fluid channel.

In some embodiments in which waveguide structure 500 includes both aperture layer 570 and a second aperture layer disposed on an opposite side of the fluid channels from aperture layer 570, the two aperture layers may include on or more pairs of corresponding apertures that are aligned and configured to pass light into and out of the same corresponding zone in a fluid channel.

In some embodiments, waveguide structure 500 may be configured to generate spatial and/or temporal patterns of emission/output light by using one or more aperture layers of the structure. In some embodiments, aperture layer 570 may be used to define a spatial pattern of emission/output signals from the one or more fluid channels, such as for directing signals from different fluid channels to different sensors. In some embodiments, aperture layer 570 may be used to define a spatial and/or temporal pattern of emission/output signals from a plurality of fluid channels of structure 500 in order to facilitate demultiplexing of the collected signals from the various channels. For example, aperture layer 570 may define a two dimensional array of apertures, as shown for example in FIG. 5A, such that each of the fluid channels 518 is disposed above a different linear pattern of apertures. The output/emission signal from each of the channels may then be collected (e.g., by a single sensor) and may be demultiplexed by using the different linear patterns (e.g., different temporal signatures read by the detector) of apertures as a signature for each respective channel.

For example, as shown in FIG. 5C, emission signals may be collected by a single sensor (or by more than one sensor) for light emitted from the three fluid channels 518 of waveguide structure 500. As analytes flow through the uppermost channel in the illustration and past the zones located above each of the apertures adjacent to the channel, the analytes may emit emission/output light through the corresponding apertures of aperture layer 570; as shown in FIG. 2C, the flow to analytes past the two apertures adjacent to the uppermost channel in the illustration may create a characteristic excitation light pattern of two peaks. Similarly, the middle channel in the illustration may produce a characteristic excitation light pattern of three peaks, and the lowermost channel in the illustration may produce a characteristic excitation light pattern of four peaks. One or more processors may be configured to automatically recognize the number of peaks and to determine which channel a signal should be attributed to based on the pattern of apertures recognized.

While the example depicted in FIG. 5C contemplates using different numbers of apertures to define characteristic aperture patterns associated with different channels, characteristic aperture patterns may in some embodiments also be formed by different aperture spacing and/or different aperture length. When using aperture spacing and/or aperture length to define a characteristic aperture pattern, particle flow rate within the associated fluid channel may be accounted for as part of defining characteristic time-varying light signals that are emitted through the apertures from the channels. In some embodiments, spatially identical aperture patterns may be disposed adjacent to fluid channels having different flow rates, and those channels may therefore create different time-varying light signals as particles pass by the aperture patterns at different speeds. Thus, one or more processors may be configured to determine which channel a time-varying light signal is attributable to based on number of peaks, length of peaks, and/or spacing of peaks (including by accounting for different analyte flow rates in different channels).

In some embodiments, in addition to spatial and/or temporal demultiplexing of signals received through the aperture layer 570, a processor may further be configured to perform spectral demultiplexing, e.g., based on the wavelength of different signals detected though the aperture layer 570. For example, one or more identical (or similar) linear aperture patterns may produce identical or similar time-varying light signals, and the processor may be configured to differentiate between the different channels based on different wavelengths of light associated with the different channels.

In some embodiments, the waveguide structure 500 may be configured to enable spectral demultiplexing by configuring one or more apertures to permit light of different wavelengths to pass through. For example, one aperture may be configured to allow emission light of a first wavelength to pass, while another aperture may be configured to allow light of a second wavelength to pass. When the output signals of different wavelengths are detected, a processor may be configured to correlate which aperture all or part of the signal was received from based on a wavelength of the signal.

It should be noted that the examples above contemplate using aperture layer 570 to create characteristic spatial and/or temporal patterns of excitation light attributable to different fluid channels; however, characteristic spatial and/or temporal patterns of excitation light attributable to different fluid channels may also be created, in whole or in part, using the second aperture layer of waveguide structure 500. For example, the second waveguide structure may be used to partially block and partially transmit excitation light in order to form different characteristic linear patterns of excitation zones in the plurality of fluid channels, such that particles in the channels will only emit output/emission signals when traveling through and excited within the excitation zones. For example, FIG. 5B shows an example of four excitation zones in a fluid channel (wherein each of the excitation zones is located above an aperture of aperture layer 570, which may or may not be used when excitation light is only incident on predefined excitation zones).

In some embodiments, different characteristic patterns of excitation zones may be formed in the plurality of fluid channels 516 of waveguide structure 500 using a two-dimensional array or pattern of apertures formed in the second aperture layer. In some embodiments, alternatively or additionally to using a second aperture to create patterns of excitation light, one or more spot-patterns of excitation light may be formed using one or more waveguides, such as by using the y-splitter arrangement of solid-core waveguides shown in FIG. 5A.

In some embodiments, an aperture formed in any aperture layer of any waveguide structure disclosed herein may be located only adjacent to a single fluid channel. In some embodiments, an aperture formed in any aperture layer of any waveguide structure disclosed herein may be located adjacent to a plurality of fluid channels; for example an elongated or slit-shaped aperture may allow light to pass into and/or out of more than one fluid channel when the aperture is located adjacent to each of the more than one fluid channels.

In addition to enabling the multiplexing capabilities described above, use of one or more aperture layers having a two-dimensional array of apertures for admitting light to pass to and/or from a plurality of fluid channels may enhance signal-to-noise ratio when using a waveguide structure, thereby increasing accuracy and helping minimize costs.

In some embodiments, a metal etch step that may be used to define precisely-sized and precisely-aligned apertures in one or more aperture layers of waveguide structure 500. In some embodiments, a wet etching processing step (e.g., KOH) may be used to create one or more openings in a substrate layer of waveguide structure 500, such as the single large opening in the substrate layer below aperture layer 570 shown in FIG. 5B. In some embodiments, alignment and sizing of the one or more openings in the substrate layer may be less critical (e.g., not require as high a level of precision for alignment and sizing) than alignment and sizing of apertures in an aperture layer. In some embodiments, a waveguide structure including one or more integrated aperture layers as described herein may have alignment pre-built into the waveguide structure, while a larger opening in the bulk of the substrate layer needs to only be coarsely aligned to the optical system (e.g., on the order of hundreds of microns) in order to form a geometry sensitive enough for single molecule detection. Such relaxations on alignment tolerances for the substrate layer may significantly reduce the cost and complexity of the optical system downstream of the detection volume.

Alternatively or additionally to etching through a substrate layer, a transparent substrate layer may be used.

In some embodiments, using one or more aperture layers as described herein may create a system that enables optical pinhole functionality built into the waveguide structure. An optical pinhole defined by an aperture of an aperture layer may define an emission spot, minimize unwanted scattered light, and enable precise definition of multi-spot patterns.

In some embodiments, if background light levels (e.g., background light emitted to the fluid channel through an opening in the substrate) are too high or if discrimination between multiple peaks is not satisfactory, the dimensions of one or more apertures in one or more aperture layers may be adjusted, and/or the thickness and/or material composition of the aperture layer itself may be adjusted (e.g., to be thicker and/or more opaque).

While the disclosure herein has discussed the use of certain oxide materials in the waveguiding layers of waveguide structures, the waveguiding layers of the structures disclosed herein may in some embodiments be formed (in whole or in part) from one or more alternate or additional materials, including but not limited to materials deposited using vapor deposition (e.g., oxide such as titanium dioxide deposited via plasma-enhanced chemical vapor deposition (PECVD) or low pressure chemical vapor deposition (LPCVD)), materials formed via thermal oxidation (e.g., silicon dioxide formed from thermal oxidation of silicon), spin-on glass, any one or more other materials that may be selected or configured for background reduction, and/or one or more plastics (e.g., polydimethylsiloxane (PDMS), cyclic olefin copolymer (COC), cyclic olefin polymer (COP)).

In some embodiments, one or more of the waveguide structures described herein may, additionally or alternatively to the waveguides described, be provided with one or more buried waveguides. For example, buried waveguides may be implemented in addition to or alternatively to trenched waveguides. In some embodiments, buried waveguides may provide one or more of the following advantages: enforcing single-moded behavior; enhancing reproducibility between chips/wafers; allowing for more facile integration of a cover layer during channel formation (e.g., there may no longer be small (e.g., 15 μm) distances between liquid channels and air gaps that may need to be fluidically sealed); and enabling the use of different cover materials (e.g., because sealing/bonding is easier, as stated above).

In some embodiments, a waveguide structure having a one-dimensional aperture array may be provided. In some embodiments, the one-dimensional aperture array may be provided in, as part of, or attached to a substrate layer or a cover layer of the structure. In some embodiments, an aperture layer may be provided between a substrate and one or more waveguiding layers (e.g., a waveguide oxide stack). In some embodiments, for example when formed in conjunction with one or more buried waveguides, such a waveguide structure may become very well-defined in terms of structure, and improved reproducibility may be provided. In some embodiments, when two or more apertures are formed along a single fluidic channel (e.g., in a one-dimensional aperture array), said apertures may be used to spatially filter excitation light of one or more waveguide arrays. For example, when using MMI and/or Y-splitting waveguides, multiple waveguides may intersect a fluidic channel; at the points of intersection, refractive index perturbation may cause excess scattering and may add unwanted background to optofluidic signals. Use of a one-dimensional aperture array may spatially filter this unwanted background out of collected signal (e.g., via optical reflection and/or absorption). Furthermore, the precise definition of apertures in an aperture array may help to define regions of signal collection, allowing for enhanced analyte detection; improvement in signal-to-noise ratio; use of signature patterns based on aperture number, spacing, and/or size to automatically identify a known aperture array, associated fluidic channel, and/or associated analytes; and/or flow-rate determination via analysis of the amount of time between signals collected via different apertures whose spacing is known or via analysis of the amount of time for which a signal is collected through a single aperture of known length.

In some embodiments, following fabrication of a waveguide structure in accordance with any one or more of the fabrication techniques disclosed herein, one or more additional processes may be performed in order to further modify the fabricated chip, including but not limited to deposition, chemical modification, alteration of surface chemistry, and/or alteration of topology. In some embodiments, these one or more additional processes may be used to modify and/or enhance one or more properties of the fabricated structure, such as a hydrophobicity, smoothness, and/or reactivity of the fabricated structure.

Figure 6:
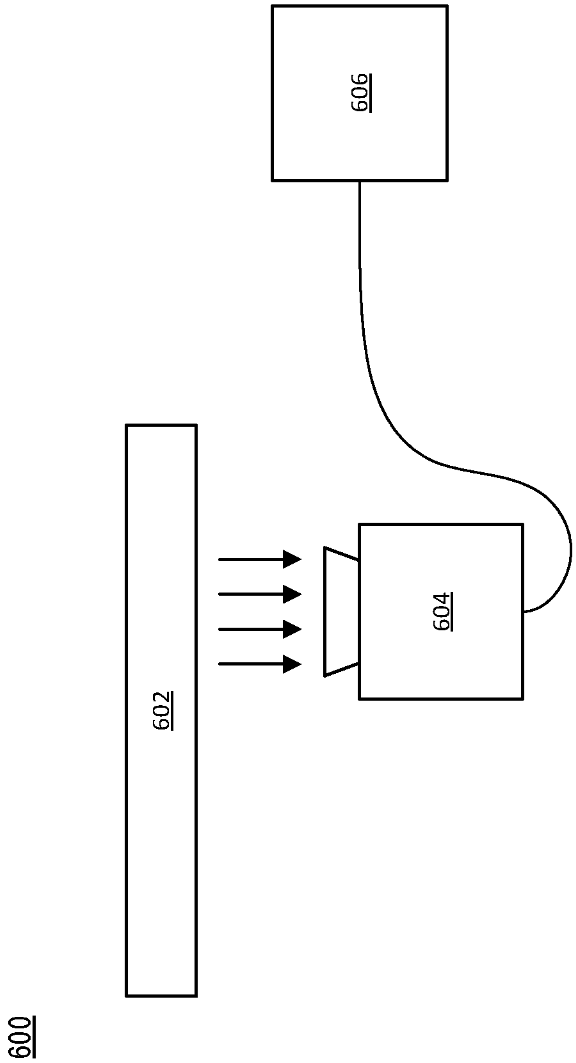
FIG. 6 depicts a system for analyte detection, in accordance with some embodiments.

FIG. 6 depicts a system 600 for analyte detection, in accordance with some embodiments. System 600 may include waveguide structure 602, photodetector 604, and processor 606. In some embodiments, waveguide structure 602 may be (or may share any one or more characteristics in common with) any of the waveguide structures described herein, including any of the waveguide structures including one or more aperture arrays described herein. In some embodiments, system 600 may be configured to perform any of the analyte detection and/or signal analysis techniques described herein, including but not limited to the analyte detection, flow-rate determination, channel/analyte/device identification, and/or demultiplexing techniques described herein including with reference to FIG. 5C.

Light emitted from waveguide structure 602 through one or more apertures of an aperture array of waveguide structure 602 may be detected by photodetector 604, which may be any suitable photodetector or other sensor for detecting said emitted light. Photodetector 604 may be provided out-of-plane of one or more analyte channels of waveguide structure 602. In some embodiments, photodetector 604 may be provided separately from waveguide structure 602. In some embodiments, photodetector 604 may be provided as a part of and/or mounted on or physically integrated into waveguide structure 602.

Photodetector 604 may be communicatively coupled (e.g., via one or more wired or wireless network communication protocols) to processor 606. Processor 606 may be provided as a local processor, remote processor or server, plurality of processors, distributed computing system, and/or cloud computing system. Processor 606 may be configured to receive data representing the light detected by photodetector 604 and to analyze said data. In some embodiments, processor 606 may be configured to perform one or more analyses based on the received data and/or to make one or more determinations based on the received data. While FIG. 6 shows a system with a single photodetector 604, in some embodiments, a system for analyte detection may include multiple photodetectors (e.g., corresponding to different apertures, different aperture arrays, and/or split signals).

For example, processor 606 may be configured to automatically recognize a pattern of apertures in one or more aperture arrays, for example by analyzing one or more of: a number of bursts detected from one or more apertures in the array, a duration of one or more bursts detected from one or more apertures in the array, a temporal spacing of one or more bursts detected from one or more apertures in the array, and/or a spectral property (e.g., wavelength) of one or more signal bursts detected from one or more apertures in the array. Based on recognizing a pattern of apertures, processor 606 may automatically determine an identity of an associated aperture array, an associated fluidic channel, an associated waveguide structure, and/or an associated analyte (e.g., an analyte known to be flowing in an associated channel). In some embodiments, based on recognizing a pattern of apertures, processor 606 automatically perform demultiplexing of signals received from multiple aperture arrays, for example by determining whether a received signal corresponds to a first aperture pattern (corresponding to a first channel) or to a second aperture pattern (corresponding to a second channel). In some embodiments, processor 606 may differentiate between signals that are detected from different one-dimensional aperture patterns that are part of a single two-dimensional aperture array.

Additionally or alternatively, processor 606 may be configured to automatically determine a flow rate of fluid in a channel, for example by analyzing burst duration and/or temporal burst spacing of bursts detected from one or more apertures in an array.

Figure 7:
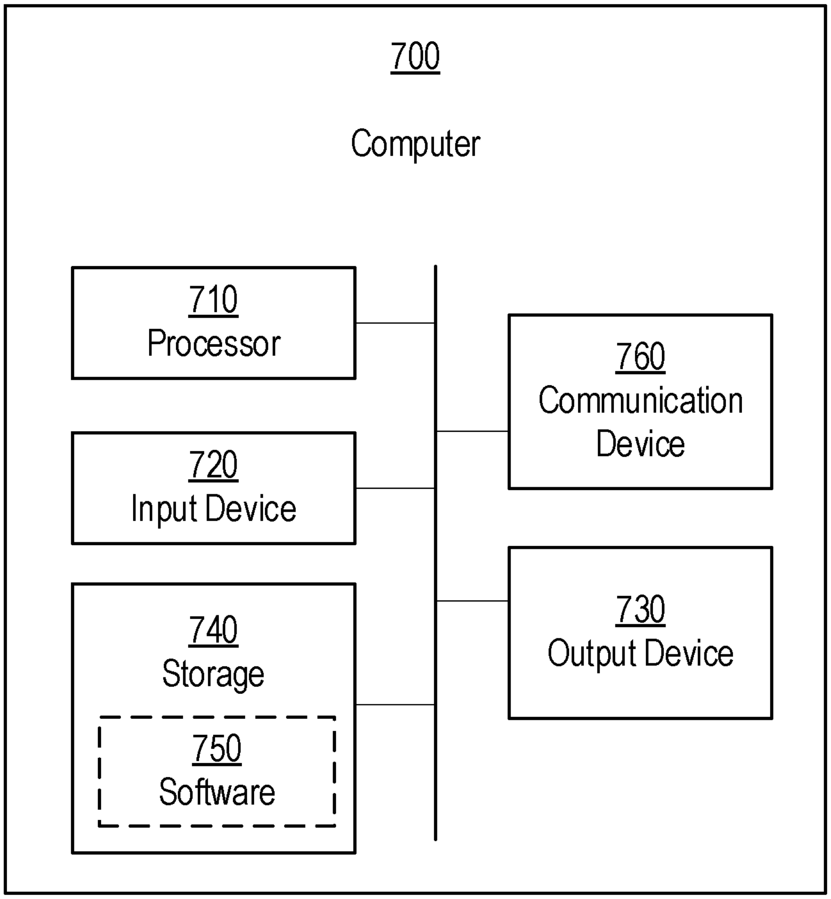
FIG. 7 depicts a computer, in accordance with some embodiments.

FIG. 7 depicts a computer, in accordance with some embodiments. Computer 700 can be a component of a system or device according to the systems, devices, and/or methods described above, such forming all or a part of processor 606 of FIG. 6. In some embodiments, computer 700 may execute all or part of a method for analyte detection, signal analysis, flow-rate determination, channel/analyte/device identification, and/or demultiplexing, such as any of the methods or techniques described herein (including, e.g., method 1000 described with respect to FIG. 10).

Computer 700 can be a host computer connected to a network. Computer 700 can be a client computer or a server. As shown in FIG. 7, computer 700 can be any suitable type of microprocessor-based device, such as a personal computer, workstation, server, or handheld computing device, such as a phone or tablet. The computer can include, for example, one or more of processor 710, input device 720, output device 730, storage 740, and communication device 760. Input device 720 and output device 730 can correspond to those described above and can either be connectable or integrated with the computer.

Input device 720 can be any suitable device that provides input, such as a touch screen or monitor, keyboard, mouse, or voice-recognition device. Output device 730 can be any suitable device that provides an output, such as a touch screen, monitor, printer, disk drive, or speaker.

Storage 740 can be any suitable device that provides storage, such as an electrical, magnetic, or optical memory, including a random access memory (RAM), cache, hard drive, CD-ROM drive, tape drive, or removable storage disk. Communication device 760 can include any suitable device capable of transmitting and receiving signals over a network, such as a network interface chip or card. The components of the computer can be connected in any suitable manner, such as via a physical bus or wirelessly. Storage 740 can be a non-transitory computer-readable storage medium comprising one or more programs, which, when executed by one or more processors, such as processor 710, cause the one or more processors to execute all or part of one or more methods, including all or part of any one or more of the methods or techniques described herein.

Software 750, which can be stored in storage 740 and executed by processor 710, can include, for example, the programming that embodies the functionality of the present disclosure (e.g., as embodied in the systems, computers, servers, and/or devices as described above). In some embodiments, software 750 can include a combination of servers such as application servers and database servers.

Software 750 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 740, that can contain or store programming for use by or in connection with an instruction execution system, apparatus, or device.

Software 750 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 700 can implement any operating system suitable for operating on the network. Software 750 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Figure 8:
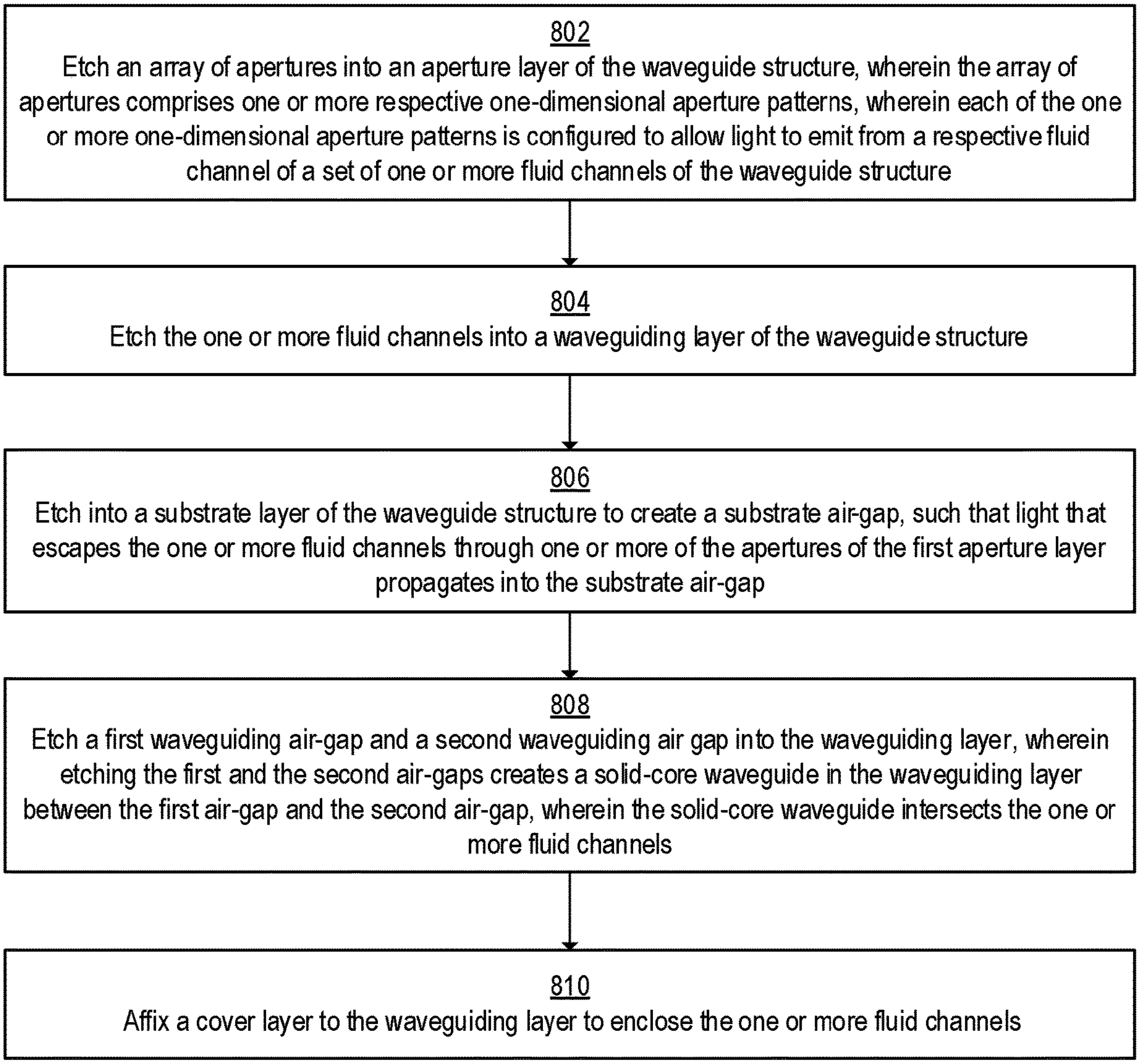
FIG. 8 depicts a method for fabricating a waveguide structure, in accordance with some embodiments.

FIG. 8 depicts a method 800 for fabricating a waveguide structure, in accordance with some embodiments. In some embodiments, method 800 may be used to fabricate one or more of the waveguide structures disclosed herein, and/or may share any one or more characteristics in common with other waveguide fabrication methods disclosed herein. A person of ordinary skill in the art will appreciate, in light of the disclosure herein, that method 800 may be modified from the example shown in FIG. 8 by addition of one or more additional steps, removal of one or more depicted steps, and/or rearrangement of one or more steps.

At block 802, in some embodiments, method 800 includes etching an array of apertures into an aperture layer of the waveguide structure, wherein the array of apertures comprises one or more respective one-dimensional aperture patterns, wherein each of the one or more one-dimensional aperture patterns is configured to allow light to emit from a respective fluid channel of a set of one or more fluid channels of the waveguide structure.

At block 804, in some embodiments, method 800 includes etching the one or more fluid channels into a waveguiding layer of the waveguide structure.

At block 806, in some embodiments, method 800 includes etching into a substrate layer of the waveguide structure to create a substrate air-gap, such that light that escapes the one or more fluid channels through one or more of the apertures of the first aperture layer propagates into the substrate air-gap.

At block 808, in some embodiments, method 800 includes etching a first waveguiding air-gap and a second waveguiding air gap into the waveguiding layer, wherein etching the first and the second air-gaps creates a solid-core waveguide in the waveguiding layer between the first air-gap and the second air-gap, wherein the solid-core waveguide intersects the one or more fluid channels.

At block 810, in some embodiments, method 800 includes affixing a cover layer to the waveguiding layer to enclose the one or more fluid channels.

Figure 9:
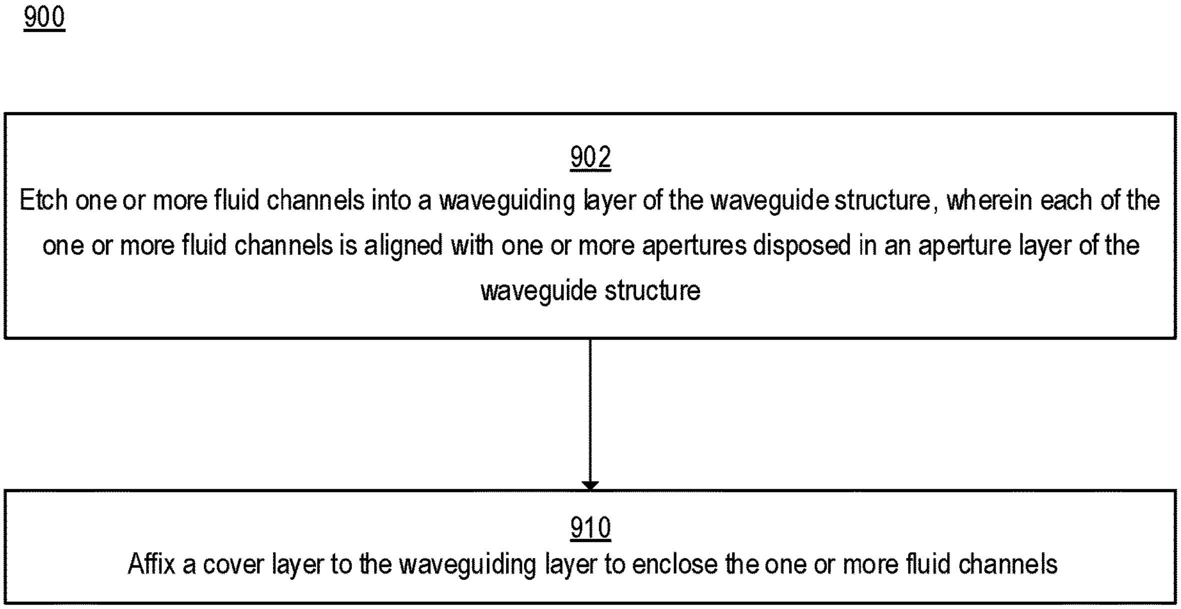
FIG. 9 depicts a method for fabricating a waveguide structure, in accordance with some embodiments.

FIG. 9 depicts a method for fabricating a waveguide structure, in accordance with some embodiments. In some embodiments, method 900 may be used to fabricate one or more of the waveguide structures disclosed herein, and/or may share any one or more characteristics in common with other waveguide fabrication methods disclosed herein. A person of ordinary skill in the art will appreciate, in light of the disclosure herein, that method 900 may be modified from the example shown in FIG. 9 by addition of one or more additional steps, removal of one or more depicted steps, and/or rearrangement of one or more steps.

At block 902, in some embodiments, method 900 includes etching one or more fluid channels into a waveguiding layer of the waveguide structure, wherein each of the one or more fluid channels is aligned with one or more apertures disposed in an aperture layer of the waveguide structure.

At block 904, in some embodiments, method 900 includes affixing a cover layer to the waveguiding layer to enclose the one or more fluid channels.

Figure 10:
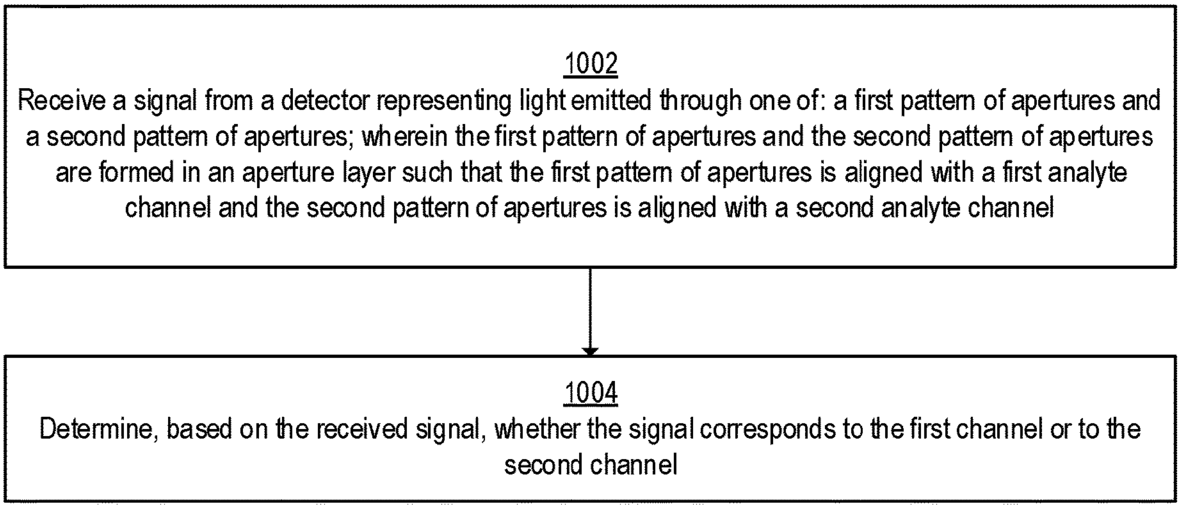
FIG. 10 depicts a method for analyzing signals representing light emitted through an aperture layer of a waveguide structure, in accordance with some embodiments.

FIG. 10 depicts a method for analyzing signals representing light emitted through an aperture layer of a waveguide structure, in accordance with some embodiments.

In some embodiments, method 1000 may be used in conjunction with a waveguide structure such as one or more of the waveguide structures disclosed herein, and/or may be used in conjunction with a system such as system 600 and/or computer 700. In some embodiments, method 1000 may share any one or more characteristics in common with any other technique for analyzing signals disclosed herein. In some embodiments, method 1000 may be performed by processor 606 of system 600 based on signals detected by detector 604 representing light emitted through an aperture layer of waveguide structure 602. A person of ordinary skill in the art will appreciate, in light of the disclosure herein, that method 1000 may be modified from the example shown in FIG. 10 by addition of one or more additional steps, removal of one or more depicted steps, and/or rearrangement of one or more steps.

At block 1002, in some embodiments, method 1000 includes receiving a signal from a detector representing light emitted through one of: a first pattern of apertures and a second pattern of apertures; wherein the first pattern of apertures and the second pattern of apertures are formed in an aperture layer such that the first pattern of apertures is aligned with a first analyte channel and the second pattern of apertures is aligned with a second analyte channel.

At block 1004, in some embodiments, method 1000 includes determining, based on the received signal, whether the signal corresponds to the first channel or to the second channel.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of any and all patents and publications referred to in this application are hereby incorporated herein by reference.

The invention claimed is:

1. A waveguide structure, the structure comprising:

a waveguiding layer comprising one or more fluid channels;

at least one waveguide that intersects the one or more fluid channels;

a first aperture layer parallel to the waveguiding layer and comprising a first array of apertures, wherein each of the one or more fluid channels is adjacent to at least one of the apertures of the first array of apertures; and a cover layer affixed to the waveguiding layer to enclose the one or more fluid channels.

2. The waveguide structure of claim 1, wherein the array of apertures comprises one or more respective one-dimensional aperture patterns, wherein each of the one or more one-dimensional aperture patterns is located adjacent to a respective one of the one or more fluid channels.

3. The waveguide structure of claim 2, wherein the one or more respective one-dimensional aperture patterns each comprise a different number of apertures.

4. The waveguide structure of claim 2, wherein the one or more respective one-dimensional aperture patterns each comprise a different spacing of apertures.

5. The waveguide structure of claim 2, wherein the one or more respective one-dimensional aperture patterns each comprise different aperture sizes.

6. The waveguide structure of claim 1, wherein the first aperture layer comprises chrome, nickel, another metal, and/or one or more ARROW layers.

7. The waveguide structure of claim 1, wherein the first aperture layer is microfabricated using one or more of sputtering, e-beam evaporation, spin coating, and coating.

8. The waveguide structure of claim 1, wherein the at least one waveguide that intersects the one or more fluid channels comprises one or more of a solid-core waveguide, an MMI waveguide, and a tunable fluid-core MMI waveguide.

9. The waveguide structure of claim 1, wherein the at least one waveguide that intersects the one or more fluid channels comprises a solid-core waveguide formed in the waveguiding layer by one or more of (i) etching a plurality of air-gaps into the waveguiding layer to define the solid-core waveguide between them and (ii) doping the waveguiding layer to define the solid-core waveguide by one or more doped regions in the waveguiding layer.

10. The waveguide structure of claim 1, comprising:

a substrate layer coupled to the waveguiding layer; and a substrate air-gap formed in the substrate layer at a location adjacent to one or more of the one or more fluid channels, such that light that escapes the one or more fluid channels adjacent to the air-gap through one or more of the apertures of the first array of apertures propagates into the substrate air-gap.

11. The waveguide structure of claim 10, wherein the substrate air-gap has a cross-sectional dimension that is larger than a cross-sectional dimension of one or more of the apertures in the first aperture layer.

12. The waveguide structure of claim 1, comprising:

a second aperture layer disposed on an opposite side of the waveguiding layer from the first aperture layer, the second aperture layer comprising a second array of apertures, wherein each of the one or more fluid channels is adjacent to at least one of the apertures of the second array of apertures.

13. The waveguide structure of claim 12, wherein the second aperture layer is disposed on or within the cover layer.

14. The waveguide structure of claim 1, wherein:

the array of apertures is a two-dimensional array of apertures forming a plurality of one-dimensional aperture patterns; and the one or more fluid channels comprise a plurality of fluid channels, wherein each of the plurality of fluid channels is adjacent to at least one of the apertures of the two-dimensional array of apertures.

15. A system for analyte detection, comprising:

a first analyte channel;

a second analyte channel;

an aperture layer parallel to a waveguiding layer comprising at least one of the first and second analyte channels, the aperture layer comprising a plurality of apertures forming a first pattern of apertures aligned with the first analyte channel and a second pattern of apertures aligned with the second analyte channel;

a detector configured to detect light emitted through the first pattern of apertures and light emitted through the second pattern of apertures; and one or more processors configured to:

receive a signal from the detector representing light emitted through one of: the first pattern of apertures and the second pattern of apertures; and determine, based on the received signal, whether the signal corresponds to the first channel or to the second channel.

16. The system of claim 15, wherein determining whether the signal corresponds to the first channel or to the second channel is performed based on determining whether a number of bursts in the signal corresponds to a number of apertures in the first pattern or to a number of apertures in the second pattern.

17. The system of claim 15, wherein determining whether the signal corresponds to the first channel or to the second channel is performed based on determining whether a duration of a light burst represented in the signal corresponds to a diameter of an aperture in the first pattern or to a diameter of an aperture in the second pattern.

18. The system of claim 15, wherein determining whether the signal corresponds to the first channel or to the second channel is performed based on determining whether a temporal spacing of two or more bursts represented in the signal corresponds to a physical spacing of two or more apertures in the first pattern or to a physical spacing of two or more apertures in the second pattern.

19. The system of claim 15, wherein determining whether the signal corresponds to the first channel or to the second channel is performed based on determining whether a wavelength of one or more bursts represented in the signal corresponds to a spectral property of one or more apertures in the first pattern or to a spectral property of one or more apertures in the second pattern.

* * * * *